(12) United States Patent
Lee et al.

(10) Patent No.: US 12,077,834 B2
(45) Date of Patent: Sep. 3, 2024

(54) EFFICIENT COPPER LEACHING USING ALKANESULFONIC ACIDS

(71) Applicant: Arizona Board of Regents on Behalf of the University of Arizona, Tucson, AZ (US)

(72) Inventors: Jaeheon Lee, Tucson, AZ (US); Junmo Ahn, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 1042 days.

(21) Appl. No.: 16/976,479

(22) PCT Filed: Feb. 28, 2019

(86) PCT No.: PCT/US2019/020128
§ 371 (c)(1),
(2) Date: Aug. 28, 2020

(87) PCT Pub. No.: WO2019/169185
PCT Pub. Date: Sep. 6, 2019

(65) Prior Publication Data
US 2020/0407821 A1    Dec. 31, 2020

Related U.S. Application Data

(60) Provisional application No. 62/636,369, filed on Feb. 28, 2018.

(51) Int. Cl.
*C22B 15/00* (2006.01)
*C22B 3/16* (2006.01)
*C22B 3/06* (2006.01)

(52) U.S. Cl.
CPC .......... *C22B 15/0071* (2013.01); *C22B 3/165* (2013.01); *C22B 3/06* (2013.01)

(58) Field of Classification Search
None
See application file for complete search history.

(56) References Cited

U.S. PATENT DOCUMENTS

| 5,755,950 A | 5/1998 | Bell |
| 5,976,265 A | 11/1999 | Sangeeta et al. |
| 2014/0131219 A1 | 5/2014 | Fassbender et al. |

FOREIGN PATENT DOCUMENTS

| CA | 2644671 A1 | 9/2007 |
| WO | WO 2013110757 | * 8/2015 |

OTHER PUBLICATIONS

Olubambi et al. Mineral Processing & Extractive Metall. Rev., 30, 2009, 327-345). (Year: 2009).*

Ahn J. et al. (2018) The Study of Copper Leaching from Conichalcite and Chalcopyrite Using Alternative Lixiviants. In: Lambotte G., Lee J., Allanore A., Wagstaff S. (eds) Materials Processing Fundamentals 2018. TMS 2018. The Minerals, Metals & Materials Series. Springer, Cham.

(Continued)

*Primary Examiner* — Yun Qian
(74) *Attorney, Agent, or Firm* — Polsinelli PC

(57) ABSTRACT

The present invention relates to use of alkysulfonic acids, with optionally an oxidant peroxide to leach copper from copper sulfide minerals or copper concentrates, a dichromate oxidant or a nitrate oxidant, or a combination thereof.

16 Claims, 24 Drawing Sheets

(56) References Cited

OTHER PUBLICATIONS

Ahn J., et al., Extraction 2018: Proceedings of the First Global Conference on Extractive Metallurgy: Alternative Lixiviant for Copper Leaching from Chalcopyrite Concentrate, pp. 1257-1265 (Abstract).
Feng, Q., Wen, S., Zhao, W. et al. Dissolution regularities of smithsonite in methane sulfonic acid. Russ. J. Non-ferrous Metals 56, 365-371 (2015).
Feng, Q. et al., Leaching of Copper from Malachite with Methane-sulfonic Acid, Solvent Extraction Research and Development, Japan. 22. 159-168 (2015).
Gernon, Michael D. et al., Environmental benefits of methanesulfonio acid: Comparative properties and advantages Green Chem., 1999,1, 127-140.
Wu, Z. (2012). Fundamental study on extracting lead from cerussite concentrate in methane sulfonic acid based solution (T). University of British Columbia. Retrieved from https://open.library.ubc.ca/collections/ubctheses/24/items/1.0073409.

\* cited by examiner

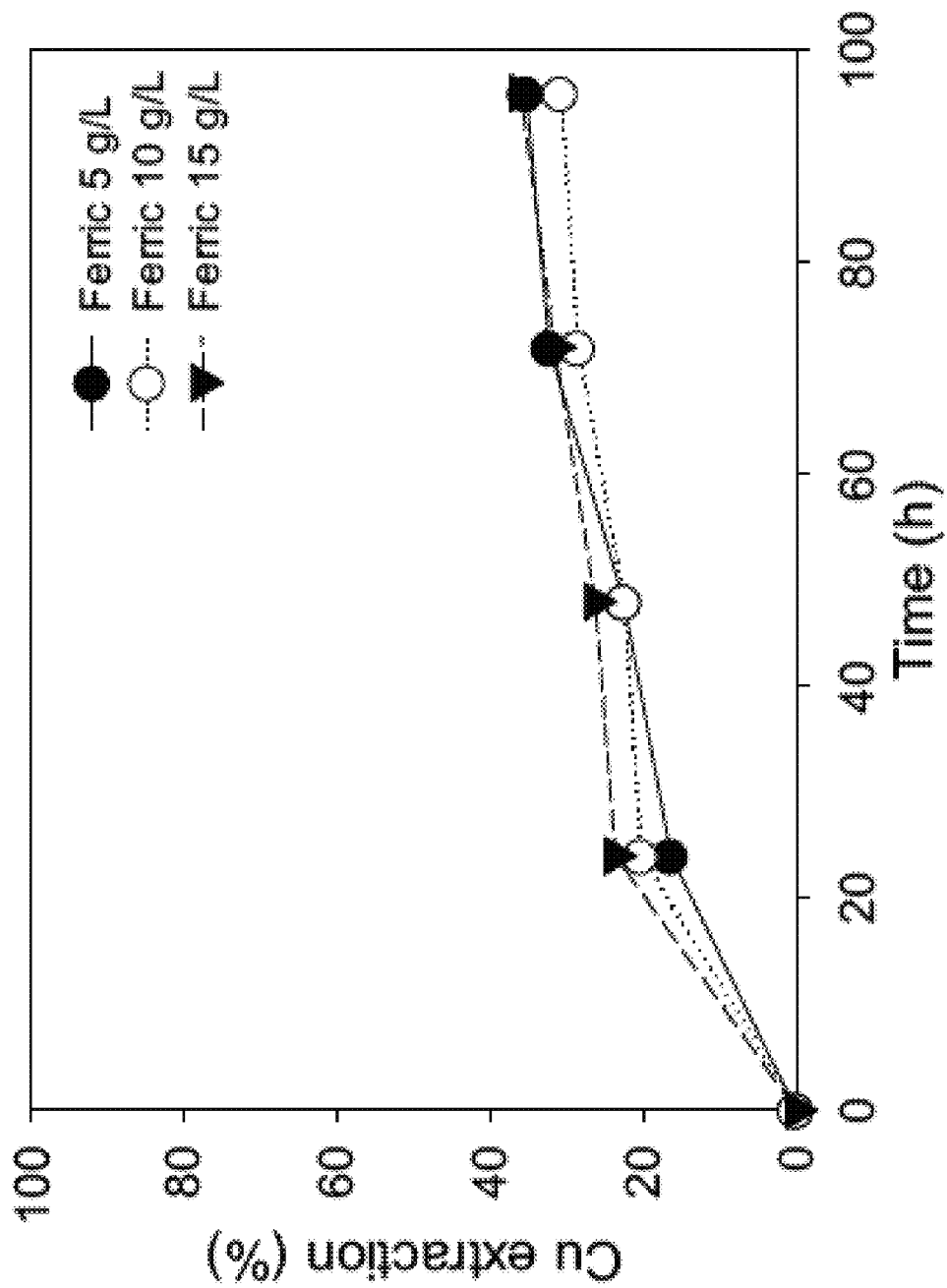

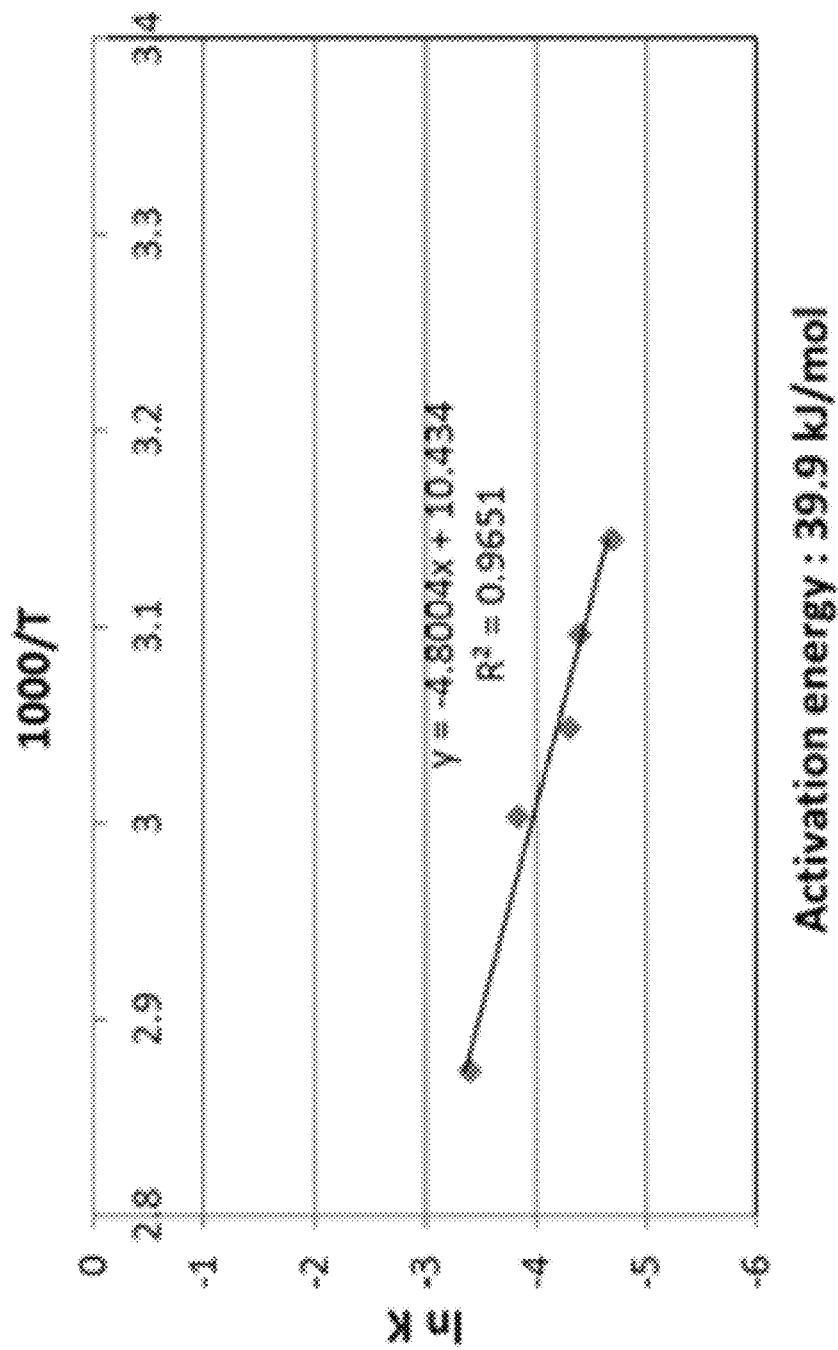

Test conditions: 30 g/L MSA and 20 g/L $Cr_2O_7^{2-}$, 1% pulp density

Activation energy: 23.28 kJ/mol

EFFICIENT COPPER LEACHING USING ALKANESULFONIC ACIDS

CROSS REFERENCE TO RELATED APPLICATIONS

This application is a U.S. national stage application of International Application No. PCT/US19/20128, filed Feb. 28, 2019, which claims the benefit of the filing date of U.S. Provisional Appl. No. 62/636,369, filed Feb. 28, 2018, the contents of which are hereby incorporated by reference in their entirety.

FIELD OF THE INVENTION

The field of the invention relates generally to the extraction of metal from ores or metal concentrates.

BACKGROUND

This background information is provided for the purpose of making information believed by the applicants to be of possible relevance to the present invention. No admission is necessarily intended, nor should it be construed, that any of the preceding information constitutes prior art against the present invention.

Copper ores can generally be divided into two categories. One is copper oxide minerals and the other is copper sulfide minerals. Traditionally, copper oxide minerals are easy to leach using conventional methods involving sulfuric acid as a leaching agent (lixiviant) with ferric ion ($Fe^{3+}$) (commonly known as "ferric") as an oxidant. For copper oxide minerals/ores, ferric is not required but if there is any copper sulfide mineral such as chalcocite ($Cu_2S$), ferric can leach copper from chalcocite.

In contrast, traditionally for copper sulfide ores, use of ferric is critical for extraction of copper. Without ferric, copper sulfide minerals (or ores) such as chalcocite($Cu_2S$), covellite (CuS), chalcopyrite etc., cannot be leached by sulfuric acid. Consequently, ferric oxidant systems have been used for many years. In short, currently for copper sulfide minerals, ferric is essential for leaching copper. Ferric acts by breaking the sulfur bonding in the sulfide and copper is released. The condition must be acidic for copper to be in aqueous solution.

For example, the common practice of leaching chalcopyrite ($CuFeS_2$) chalcopyrite ($CuFeS_2$), the most abundant copper resource which represents about 70% of copper deposit in the world, is to use sulfuric acid with ferric ion as an oxidant. However, it is very difficult to extract copper from chalcopyrite with higher extraction percentages due to its refractoriness. There are a few factors affecting the difficulties of chalcopyrite leaching and the most common cause is the passivation on chalcopyrite surface due to the byproducts such as elemental sulfur, metal sulfide, or jarosite. There are several processing options to leach copper from chalcopyrite in higher efficiency including bioleaching, pressure oxidation, and pyrite addition.

Most oxides are leached by heap/dump leaching with reasonable copper recovery. However, leaching copper from copper sulfide minerals (or ore) requires a different approach. Copper sulfide whole ores (copper contents vary from 0.5% or even lower to a few %) needs to be crushed and ground to decrease the size down to 100 micron or smaller. These ground ores are processed by flotation which uses chemicals and air purging in a tank. The surface of the copper sulfide mineral is modified by the chemical to become hydrophobic and air bubbles are attached on these particles making them float. Using this method, copper concentrate can be made with 30-60% copper content. The value of metal on the concentrate is very high so it can be can processed in a smelter. Smelting is high temperature pyrometallurgical processing method using heat to oxidize sulfide mineral. Copper's melting point is 1084° C. so the process temperature is around 1500° C. Smelter is very expensive to build and to operate as well. Due to $SO_2$ gas emission (formed by sulfur being oxidized oxygen during the leaching process), it is hard to get a permit to build smelters because of environmental concerns. In fact, in the U.S. there used to be more than dozens of smelters but now we only have three in the North America, two in the U.S. (one in Salt Lake City and one in Miami AZ), and one in Canada.

The inventors have surprisingly found that low-grade sulfide ores can be increased in heap leaching to dump leaching. Currently, low grade chalcopyrite (<0.1%) can't be processed aforementioned flotation because it costs more than the value of the rock/ore. So, industry makes a dump/heap (literally a pile of rock) and leach using sulfuric acid and ferric as an oxidant. Bioleaching can be utilized to increase the sulfur oxidation, but it costs a little bit more. Anyway, the low-grade dump leaching of chalcopyrite is running in many places around the world and the copper recovery is only around 15-25% on a good day. It could be 10% or even less. Companies don't want to waste their operating cost due to the low value and whatever the extraction from these dump, they move on because the CapEx and OpEx for dump leaching is so low.

The present invention effectively addresses this problem. In fact, one advantage of the invention is that where the copper concentrates grade is too low to be processed by smelter economically, those concentrates can be processed by the methods disclosed herein, by for example, leaching copper by using an alkanesulfonic acid such as methanesulfonic acid (MSA) with a lower CapEx and OpEx. The inventors have surprisingly discovered that MSA with a peroxide (such as hydrogen peroxide) can get additional 15-25% copper extraction since it simply doubles the extraction and resulting in increased copper extraction from low grade chalcopyrite ore. The inventors also discovered use of dichromate salt and nitrate salt as oxidant is advantageous for increased copper extraction. Low grade chalcopyrite is about 70% of the available copper resource in the world and therefore it has been a great challenge to increase the extraction from these materials. Furthermore, use of an alkanesulfonic acic such as MSA, which has a relatively low toxicity and which is less corrosiveness would be advantageous when applied to leaching sites and hydrometallurgical plants (when compared to current leaching methods).

In summary, the inventors have surprisingly found alternative chemicals suitable for copper leaching without complex pretreatment or addition of other materials.

SUMMARY

The inventors have discovered lower cost chemical alternatives suitable for copper leaching from copper sulfide minerals or ores (e.g., chalcopyrite), or copper concentrates, without complex pretreatment or addition of other materials.

One aspect of the invention pertains to a method of extracting copper from a copper sulfide mineral comprising contacting said mineral with an alkylsulfonic acid and optionally a peroxide chosen from the group consisting of hydrogen peroxide and metal peroxide.

Another aspect of the invention pertains to a method of extracting copper from a copper sulfide mineral comprising contacting said mineral with an alkylsulfonic acid and optionally a dichromate salt.

Another aspect of the invention pertains to a method of extracting copper from a copper sulfide mineral comprising contacting said mineral with an alkylsulfonic acid and optionally a nitrate salt.

One aspect of the invention pertains to a method of extracting copper from a copper sulfide mineral comprising contacting said mineral with an alkylsulfonic acid and optionally a peroxide chosen from the group consisting of hydrogen peroxide and metal peroxide, a dichromate salt, or a nitrate salt, or a combination thereof.

Another aspect of the invention pertains to a method of extracting copper from a copper concentrate with a copper content of 0.1%-60% comprising contacting said concentrate with an alkylsulfonic acid and optionally a peroxide chosen from the group consisting of hydrogen peroxide and metal peroxide.

Another aspect of the invention pertains to a method of extracting copper from a copper concentrate with a copper content of 0.1%-60% comprising contacting said concentrate with an alkylsulfonic acid and optionally a peroxide chosen from the group consisting of hydrogen peroxide and metal peroxide, a dichromate salt, or a nitrate salt, or a combination thereof.

A further aspect of the invention pertains to a method of extracting copper from copper sulfide mineral comprising contacting said mineral with methanesulfonic acid and, optionally hydrogen peroxide.

A further aspect of the invention pertains to a method of extracting copper from copper sulfide mineral comprising contacting said mineral with methanesulfonic acid and, optionally potassium dichromate ($K_2Cr_2O_7$) or sodium dichromate ($Na_2Cr_2O_7$).

A further aspect of the invention pertains to a method of extracting copper from copper sulfide mineral comprising contacting said mineral with methanesulfonic acid and, optionally sodium nitrate ($NaNO_3$) or potassium nitrate ($KNO_3$).

Another aspect of the invention pertains to a method of extracting copper from a copper concentrate with a copper content of 0.1%-60% comprising contacting said concentrate with methanesulfonic acid and, optionally hydrogen peroxide.

Another aspect of the invention pertains to a method of extracting copper from a copper concentrate with a copper content of 0.1%-60% comprising contacting said concentrate with methanesulfonic acid and, optionally potassium dichromate ($K_2Cr_2O_7$) or sodium dichromate ($Na_2Cr_2O_7$).

Another aspect of the invention pertains to a method of extracting copper from a copper concentrate with a copper content of 0.1%-60% comprising contacting said concentrate with methanesulfonic acid and, optionally sodium nitrate ($NaNO_3$) or potassium nitrate ($KNO_3$).

It is to be understood that both the foregoing general description of the invention and the following detailed description are exemplary, and thus do not restrict the scope of the invention.

BRIEF DESCRIPTION OF THE FIGURES

FIG. 2(c) represents the kinetic result of sulfurous acid with ferric leaching test for 96 hours.

FIG. 9(a)-(d) shows the effect of temperature on chalcopyrite leaching when MSA and hydrogen peroxide were used with the comparison of 5 g/L sulfuric acid (which showed the best copper extraction in FIG. 2(b)) and the same amount of hydrogen peroxide as a baseline.

DETAILED DESCRIPTION

Definitions

Figure 1A:
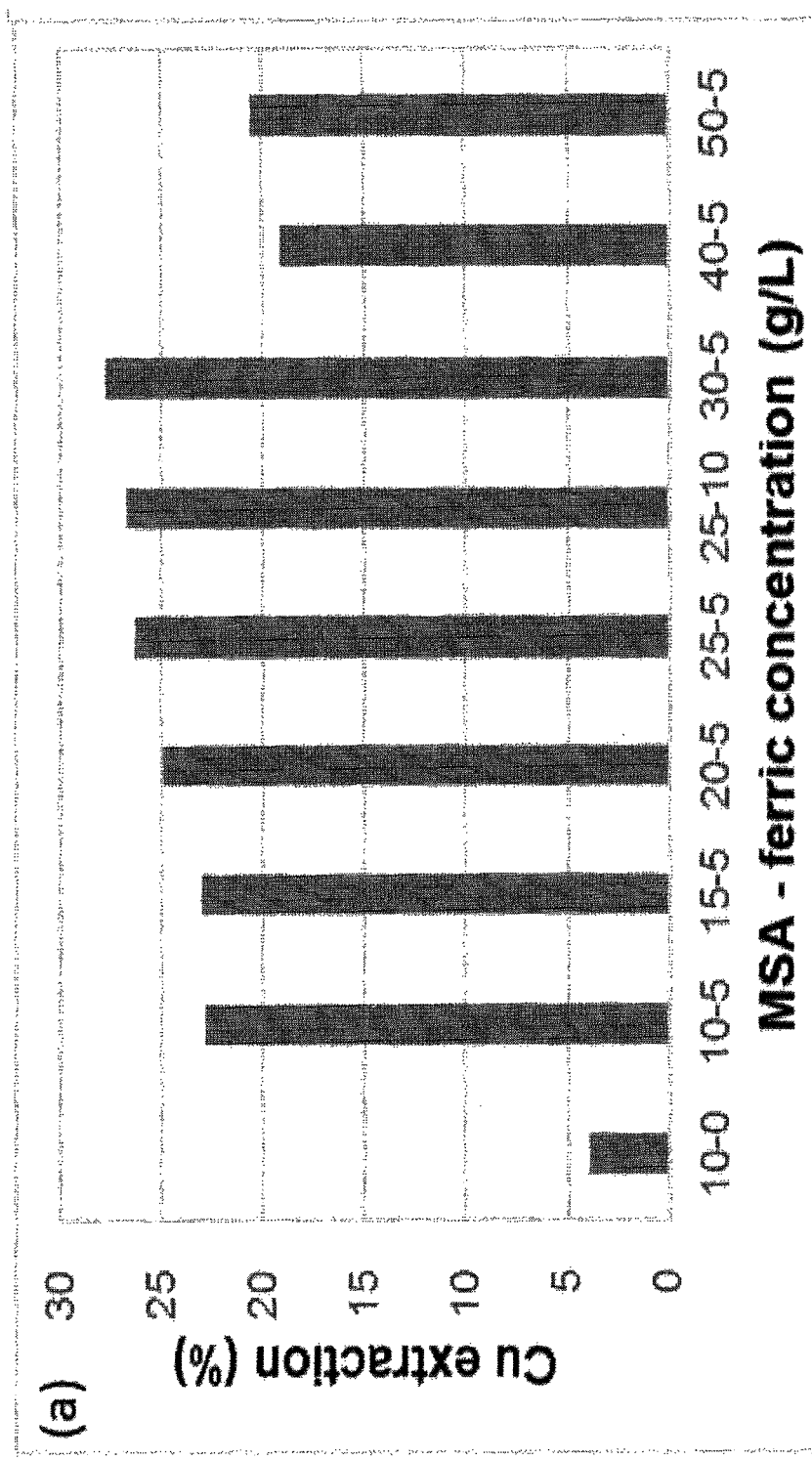
FIG. 1(a). shows copper extraction by MSA and ferric concentration.

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated invention, and further applications of the principles of the invention as illustrated therein are herein contemplated as would normally occur to one skilled in the art to which the invention relates.

Unless defined otherwise, all technical and scientific terms used herein have the same meaning as commonly understood by one of ordinary skill in the art to which this invention pertains.

For the purpose of interpreting this specification, the following definitions will apply and whenever appropriate, terms used in the singular will also include the plural and vice versa. In the event that any definition set forth below conflicts with the usage of that word in any other document, including any document incorporated herein by reference, the definition set forth below shall always control for purposes of interpreting this specification and its associated claims unless a contrary meaning is clearly intended (for example in the document where the term is originally used).

The use of "or" means "and/or" unless stated otherwise.

The use of "a" or "an" herein means "one or more" unless stated otherwise or where the use of "one or more" is clearly inappropriate.

The use of "comprise," "comprises," "comprising," "include," "includes," and "including" are interchangeable and not intended to be limiting. Furthermore, where the description of one or more embodiments uses the term "comprising," those skilled in the art would understand that, in some specific instances, the embodiment or embodiments can be alternatively described using the language "consisting essentially of" and/or "consisting of."

As used herein, the term "about" refers to a ±10% variation from the nominal value. It is to be understood that such a variation is always included in any given value provided herein, whether or not it is specifically referred to.

The terms "alkylsulfonic acid" and "alkanesulfonic acid" are used interchangeably herein and refer to sulfonic acids of the general formula:

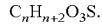

$C_nH_{n+2}O_3S$.

The terms "alkylsulfonic acid" and "alkanesulfonic acid" includes methanesulfonic acid, ethanesulfonic acid, propanesulfonic acid, butanesulfonic acid, pentanesulfonic acid, hexanesulfonic acid, heptanesulfonic acid, octanesulfonic acid, nonanesulfonic acid, and decanesulfonic acid.

The term "alkyl" as used herein by itself or as part of another group refers to both straight and branched chain radicals. In one embodiment, the alkyl group has 1-12 carbons. In another embodiment, the alkyl group has 1-7 carbons. In another embodiment, the alkyl group has 1-6 carbons. In another embodiment, the alkyl group has 1-4 carbons (also referred to as "C1-4 alkyl" or "C1-4 alkyl"). The term "alkyl" may include methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, nonyl, decyl, undecyl, and dodecyl.

The term "the methods disclosed herein" is used interchangeably with the terms, "the methods of the invention", "the invention" and the like, to refer to the present invention outlined in this application.

The terms "copper sulfide mineral", "copper sulfide ore", and "copper sulfide mineral/ore" are used interchangeably herein to refer to natural occurring copper sulfide materials.

It is to be understood that both the foregoing description are exemplary, and thus do not restrict the scope of the invention.

Use of AlkylSulfonic Acid and, Optionally a Peroxide Chosen from the Group Consisting of Hydrogen Peroxide and Metal Peroxide, a Dichromate Salt, or a Nitrate Salt, or a Combination Thereof to Leach Copper One aspect of the invention pertains generally to a method of extracting copper from a copper sulfide mineral comprising contacting said mineral with an alkylsulfonic acid and optionally a peroxide chosen from the group consisting of hydrogen peroxide and metal peroxide.

A further aspect of the invention pertains generally to a method of extracting copper from a copper sulfide mineral comprising contacting said mineral with an alkylsulfonic acid and optionally a peroxide chosen from the group consisting of hydrogen peroxide and metal peroxide, a dichromate salt, or a nitrate salt, or a combination thereof.

Another aspect of the invention pertains generally to a method of extracting copper from a copper concentrate with a copper content of 0.1%-60% comprising contacting said concentrate with an alkylsulfonic acid and optionally a peroxide chosen from the group consisting of hydrogen peroxide and metal peroxide.

Another aspect of the invention pertains generally to a method of extracting copper from a copper concentrate with a copper content of 0.1%-60% comprising contacting said concentrate with an alkylsulfonic acid and optionally a peroxide chosen from the group consisting of hydrogen peroxide and metal peroxide, a dichromate salt, or a nitrate salt, or a combination thereof.

Another aspect of the invention pertains generally to a method of extracting copper from copper sulfide mineral comprising contacting said mineral with methanesulfonic acid and, optionally hydrogen peroxide.

A further aspect of the invention pertains to a method of extracting copper from copper sulfide mineral comprising contacting said mineral with methanesulfonic acid and, optionally potassium dichromate ($K_2Cr_2O_7$) or sodium dichromate ($Na_2Cr_2O_7$).

A further aspect of the invention pertains to a method of extracting copper from copper sulfide mineral comprising contacting said mineral with methanesulfonic acid and, optionally sodium nitrate ($NaNO_3$) or potassium nitrate ($KNO_3$).

Another aspect of the invention pertains generally a method of extracting copper from a copper concentrate with a copper content of 0.1%-60% comprising contacting said concentrate with methanesulfonic acid and, optionally hydrogen peroxide.

In some embodiments, the invention encompasses leaching of a copper sulfide mineral/ore chosen from Chalcopyrite ($CuFeS_2$), Covellite (CuS), Chalcocite ($Cu_2S$), Enargite ($Cu_3AsS_4$), Bornite ($Cu_5FeS_4$), or Digenite ($Cu_9S_5$) using a method disclosed herein.

In some embodiments, the methods of the invention may involve use of a peroxide chosen from hydrogen peroxide and metal peroxide. In further embodiments, the metal peroxide may be barium peroxide or potassium peroxide.

In some embodiments, the methods of the invention may involve use of one or more dichromate salts. The dichromate salt may be chosen from lithium dichromate ($Li_2Cr_2O_7$), potassium dichromate ($K_2Cr_2O_7$), sodium dichromate ($Na_2Cr_2O_7$).

In some embodiments, the methods of the invention may involve use of one or more nitrate salts. The nitrate salt may be chosen from lithium nitrate ($LiNO_3$), sodium nitrate ($NaNO_3$), and potassium nitrate ($KNO_3$).

The methods disclosed herein may involve contacting peroxide with copper ore for about 24 to about 96 hours. In further embodiments, methods disclosed herein may involve contacting peroxide with copper ore or copper concentrate for about 96 hours.

The methods disclosed herein may involve contacting peroxide and/or dichromate salt, and/or a nitrate salt with copper ore for about 24 to about 96 hours. In further embodiments, methods disclosed herein may involve contacting peroxide and/or dichromate salt, and/or a nitrate salt with copper ore or copper concentrate for about 96 hours.

The methods disclosed herein may involve contacting peroxide and/or dichromate salt, and/or a nitrate salt with copper ore for about 24 hours.

In some embodiments, the methods disclosed herein may involve adding peroxide and/or dichromate salt, and/or a nitrate salt to copper mineral or copper concentrate periodically at a rate of about every 24 hours for up to about 48 hours to about 96 hours.

In some embodiments, the methods disclosed herein may involve use of dichromate salt at a concentration of about 10 to about 30 g/l. In some embodiments, the methods disclosed herein may involve use of dichromate salt at a concentration of about 12 to about 25 g/l. In some embodiments, the methods disclosed herein may involve use of dichromate salt at a concentration of about 18 to about 23 g/l. In further embodiments, the methods disclosed herein may involve use of dichromate salt at a concentration of about 20 g/l. In further embodiments, the methods disclosed herein may involve use of dichromate salt at a concentration of about 15 g/l.

In some embodiments, the methods disclosed herein may involve use of nitrate salt at a concentration of about 10 to about 30 g/l. In some embodiments, the methods disclosed herein may involve use of nitrate salt at a concentration of about 12 to about 25 g/l. In some embodiments, the methods disclosed herein may involve use of nitrate salt at a concentration of about 18 to about 23 g/l. In further embodiments, the methods disclosed herein may involve use of nitrate salt at a concentration of about 20 g/l. In further embodiments, the methods disclosed herein may involve use of nitrate salt at a concentration of about 15 g/l.

In some embodiments, the methods disclosed herein may involve use of peroxide at a concentration of about 0.3 to about 15% (v/v) peroxide. In further embodiments, the methods disclosed herein may involve use of peroxide at a concentration of about 0.3 to about 4.5% (v/v) peroxide. In other embodiments, use of peroxide in the methods disclosed herein may be at a concentration of about 0.3, about 0.6, about 0.9, about 1.5, about 3.0 and about 4.5% (v/v) hydrogen peroxide. In further embodiments, the methods disclosed herein may involve adding hydrogen peroxide periodically at a rate of about 24 hours for up to about 96 hours.

In some embodiments, the methods disclosed herein may involve contacting use about 30 g/L methanesulfonic acid and about 0.9% (v/v) hydrogen peroxide with a copper sulfide mineral or copper concentrate. In further embodiments, these methods involve heating at at a temperature selected from the group consisting of about 25° C., about 45° C., about 50° C., about 55° C., about 60° C. and about 75° C. for 24-96 hours.

In some embodiments, the methods disclosed herein may involve contacting use about 30 g/L methanesulfonic acid and 0.3% (v/v) to about 0.9% (v/v) hydrogen peroxide (or about 0.3% (v/v) to about 3% (v/v) hydrogen peroxide) with a copper sulfide mineral or 0.1%-60% copper concentrate. In further embodiments, these methods involve heating at a temperature selected from the group consisting of about 25° C., about 45° C., about 50° C., about 55° C., about 60° C. and about 75° C. for 24-96 hours.

In some embodiments, the methods disclosed herein may involve contacting use about 30 g/L methanesulfonic acid and dichromate salt at a concentration of about 20 g/l. with a copper sulfide mineral or copper concentrate. In further embodiments, these methods involve heating at at a temperature selected from the group consisting of about 25° C., about 45° C., about 50° C., about 55° C., about 60° C. and about 75° C. for 24-96 hours.

In some embodiments, the methods disclosed herein may involve contacting use about 30 g/L methanesulfonic acid and nitrate salt at a concentration of about 20 g/l. with a copper sulfide mineral or copper concentrate. In further embodiments, these methods involve heating at at a temperature selected from the group consisting of about 25° C., about 45° C., about 50° C., about 55° C., about 60° C. and about 75° C. for 24-96 hours.

In some embodiments, the methods disclosed herein may involve the use of sulfonic acid of the general formula: $C_nH_{n+2}O_3S$ (also refered to as "alkylsulfonic acid" or "alkanesulfonic acid").

In some embodiments, the methods disclosed herein may include use of an "alkylsulfonic acid" or "alkanesulfonic acid" chosen from the group consisting of methanesulfonic acid, ethanesulfonic acid, propanesulfonic acid, butanesulfonic acid, pentanesulfonic acid, hexanesulfonic acid, heptanesulfonic acid, octanesulfonic acid, nonanesulfonic acid, and decanesulfonic acid.

In further embodiments, the invention may involve use of methanesulfonic acid, ethanesulfonic acid, or propanesulfonic acid.

In some embodiments, the invention may involve use of an alkylsulfonic acid (or alkanesulfonic acid) at a concentration of about 1 to about 300 g/L.

In some embodiments, the invention may involve use of an alkylsulfonic acid at a concentration of about 10 to about 90 g/L.

In some embodiments, the invention may involve use of an alkylsulfonic acid at a concentration of about 20 to about 80 g/L.

In some embodiments, the invention may involve use of an alkylsulfonic acid at a concentration of about 20 to about 70 g/L.

In some embodiments, the invention may involve use of an alkylsulfonic acid at a concentration of about 20 to about 60 g/L.

In some embodiments, the invention may involve use of an alkylsulfonic acid at a concentration of about 20 to about 50 g/L.

In some embodiments, the invention may involve use of an alkylsulfonic acid at a concentration of about 20 to about 40 g/L.

In some embodiments, the invention may involve use of an alkylsulfonic acid at a concentration of about 20 to about 30 g/L.

In some embodiments, the invention may involve use of an alkylsulfonic acid at a concentration of about 10 to about 30 g/L.

In some embodiments, the invention may involve use of an alkylsulfonic acid at a concentration of about 25 to about 35 g/L.

In some embodiments, the invention may involve use of an alkylsulfonic acid at a concentration of about 30 to about 35 g/L.

In some embodiments, the invention may involve use of an alkylsulfonic acid at a concentration of about 35 to about 40 g/L.

In some embodiments, the invention may involve use of an alkylsulfonic acid at a concentration of about 25 to about 40 g/L.

In some embodiments, the invention may involve use of an alkylsulfonic acid at a concentration of about 30 g/L.

In some embodiments, the invention may involve use of methylsulfonic acid.

One aspect of the invention may involve leaching or extracting copper at a temperature of about 20° C. to about 100° C. In some embodiments, the invention may involve leaching or extracting copper at a temperature selected from the group consisting of about 25° C., about 45° C., about 50° C., about 55° C., about 60° C. and about 75° C.

In further embodiments, the invention may involve leaching or extracting copper at a temperature of about 20° C. to about 25° C.

In further embodiments, the invention may involve leaching or extracting copper at a temperature of about 25° C.

In further embodiments, the invention may involve leaching or extracting copper at a temperature of about 20° C.

In further embodiments, the invention may involve leaching or extracting copper at a temperature of about 60° C.

In further embodiments, the invention may involve leaching or extracting copper at a temperature of about 75° C.

One aspect of the invention may involve carrying out leaching or extraction at a pulp density of about 1%, 2%, 4.7%, or 9.1%. In a further embodiment, the invention involves carrying out leaching or extraction at a pulp density of about 2%. In another embodiment, the invention involves carrying out leaching or extraction at a pulp density of about 1%.

Another aspect of the invention may involve extracting or leaching copper from a copper concentrate with a copper content of about 20% to about 40%. In some embodiments, the copper content of the copper concentrate may be about 20% to about 30%. In other embodiments, the copper content of the copper concentrate may be about 25% to about 30%.

It is to be understood that both the foregoing general description of the invention and the following detailed description are exemplary, and thus do not restrict the scope of the invention.

Examples

Chalcopyrite, the most abundant copper mineral on the earth, is a refractory sulfide mineral. The refractory property hinders chemical leaching of chalcopyrite by a conventional lixiviant, sulfuric acid. Therefore, the kinetic study of chalcopyrite leaching by one of the alternative lixiviants such as MSA (methanesulfonic acid) was studied to enhance the copper extraction. A suite of leaching tests of chalcopyrite at 75° C. with various lixiviants exhibited that MSA showed the highest copper extraction of 47% at 96 hours with 30 g/L MSA and 5 g/L ferric. The copper extraction increased to over 90% with hydrogen peroxide as an oxidant at 75° C. The activation energy of the reaction with MSA and hydrogen peroxide was calculated to be 39.9 kcal/mol indicating that the reaction is controlled by the surface chemical reaction.

Materials and Methods

Sample Preparation

Chalcopyrite concentrate samples (P80 75 μm) from an activate copper mine in southern Arizona were used for the leaching tests. The elemental composition of chalcopyrite concentrate was 28.8% Cu, 26.8% Fe and 31.5% S as shown in Table 1. XRD result in Table 2 showed that the 87% of ore material in the sample consists of 95% chalcopyrite, 3% pyrite, and 2% cuprite. About 13% of the sample contains gangue minerals.

TABLE 1

Elemental composition of chalcopyrite concentrate sample in this study

| Elements | Grade (%) |
| --- | --- |
| Copper (Cu) | 28.8 |
| Iron (Fe) | 26.8 |
| Sulfur (S) | 31.05 |
| Others | 13.35 |

TABLE 2

XRD analysis of chalcopyrite concentrate sample in this study

| Material | Composition (%) |
| --- | --- |
| Chalcopyrite ($CuFeS_2$) | 95 |
| Pyrite ($FeS_2$) | 3.0 |
| Chalcocite ($Cu_2S$) | 2.0 |

Leaching Test

Baseline sulfuric acid copper leaching was performed using ferric ion as an oxidant. MSA (Methanesulfonic acid) and sulfurous acid were used as alternative lixiviants to compare the results with sulfuric acid. Acid beaker leaching tests were carried out and the condition of 1% pulp density at 75° C. was set for each test. 24 hours leaching tests were carried out by changing the concentration of leaching agents from 5 to 50 g/L for both sulfuric acid and sulfurous acid with ferric as an oxidant adjusted from 0 to 15 g/L. MSA was compared with the half concentration of sulfuric acid and sulfurous acid as it dissociates one proton and one methanesulfonate ion. The MSA concentration was set from 10 to 50 g/L with 0 to 15 g/L ferric. After 24 hours beaker tests, three of each lixiviants conditions were selected and 96 hours beaker test was performed to optimize the concentration of leaching agent. After the optimization of the concentration of lixiviant, ferric concentration was set from 1 to 10 g/L to find the effect of oxidant on chalcopyrite leaching. Multi stage leaching test was performed by replacing fresh lixiviant and oxidant for every 48 hours and ran up to 144 hours to find out the possibility of copper extraction from leaching residues by MSA with ferric medium.

An alternative oxidant, hydrogen peroxide (hydrogen peroxide) was also tested. MSA was tested from 10 to 30 g/L to find the effect of lixiviant concentration on chalcopyrite leaching with an oxidant, hydrogen peroxide. Also, hydrogen peroxide was tested by adding 0.3, 0.6, 0.9, 1.5, 3 and 4.5% (v/v) hydrogen peroxide with periodical addition at every 24 hours for 96 hours leaching tests to optimize the oxidant concentration for chalcopyrite leaching test. After the optimization test, pulp density was changed by 1, 2, 4.7 and 9.1%. Finally, temperature decreased from 75° C. to 60, 55, 50, 45 and 25° C. to calculate activation energy.

Analytical Method (AA, Titration etc.)

Samples were obtained at 2, 6, 24, 48, 72 and 96 hours from leaching tests. The copper and iron concentrations from solution samples were analyzed by Atomic Absorption (AA) spectrophotometer (Perkin-Elmer, USA). Ferric concentration was analyzed by iron titration method. Also, the concentration of hydrogen peroxide was analyzed by colorimetric titration with ceric sulfate (ref).

Results and Discussion

Chalcopyrite Leaching with Alternative Lixiviants

Chalcopyrite leaching with alternative lixiviants such as MSA and sulfurous acid was tested comparing leaching by sulfuric acid as a baseline. In FIG. 1(a), copper extraction by MSA and ferric concentration was illustrated. The increase of MSA concentration from 10 to 30 g/L tended to enhance copper dissolution from chalcopyrite. The difference between 10-0 (4%) and 10-5 (22%) shows that an oxidant such as ferric is required for chalcopyrite leaching in acidic condition. At the same MSA concentration of 25 g/L, higher ferric concentration (10 g/L) showed no significant copper extraction increase compared to lower ferric condition (5 g/L). Higher than 30 g/L, the copper dissolution decreased to around 15% which means higher MSA concentration with 5 g/L had negative effects on copper extraction from chalcopyrite. Overall, 30 g/L MSA with 5 g/L ferric showed the highest copper extraction about 27%.

Figure 1B:
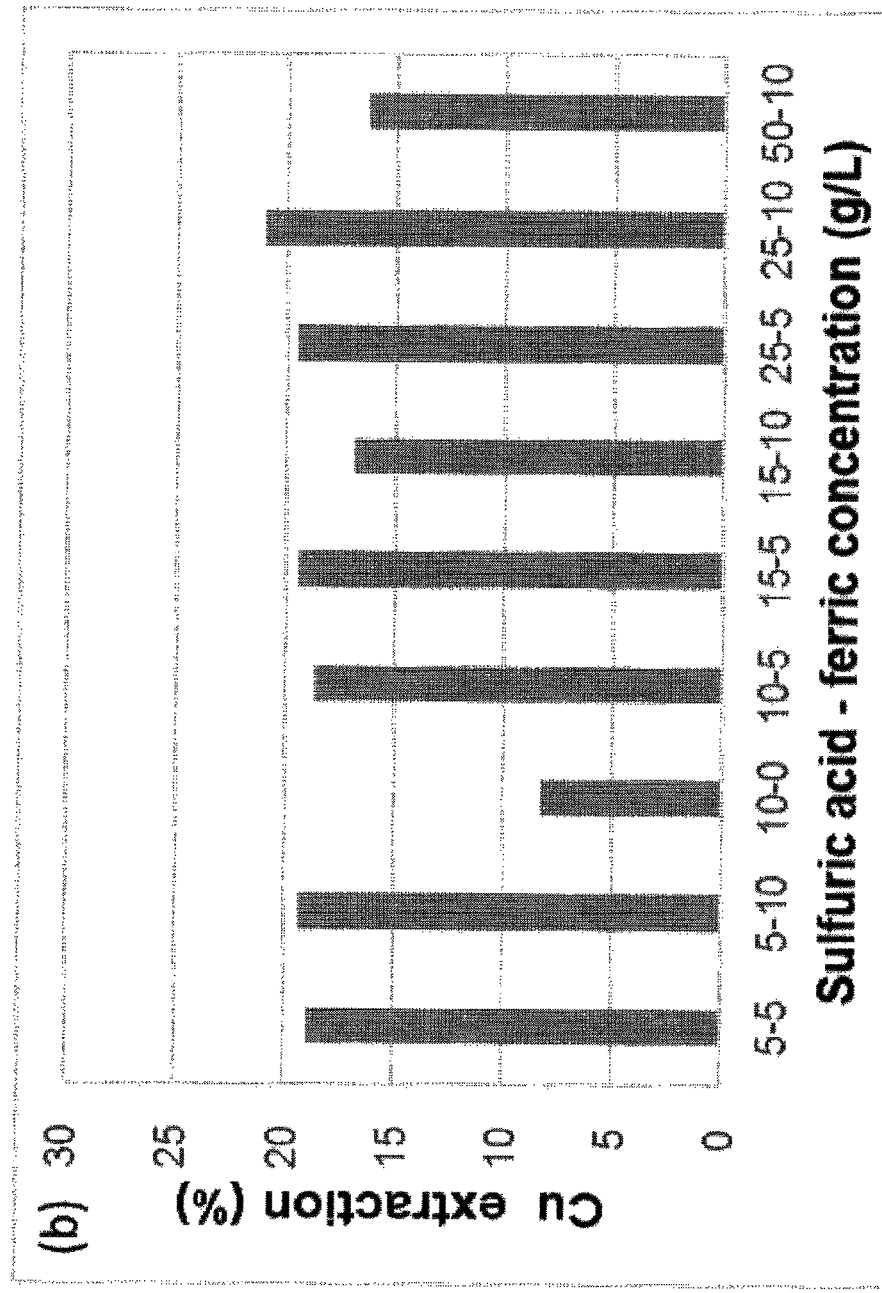
FIG. 1(b). shows copper extraction by various concentration of sulfuric acid and ferric.

FIG. 1(b) shows the copper extraction by various concentration of sulfuric acid and ferric. Copper extraction from 5 g/L to 25 g/L sulfuric acid showed no significant difference among various conditions that achieved around 20%. Higher than 25 g/L, 50 g/L sulfuric acid condition showed the decrease of copper dissolution from 21% to 16%. Ferric was also important role in chalcopyrite leaching by sulfuric acid as higher Cu dissolution at the presence of 5 g/L ferric at 10 g/L sulfuric acid (18%) compared to without ferric (8%). However, there was no correlation regarding ferric concentration and Cu extraction higher than 5 g/L.

Figure 1C:
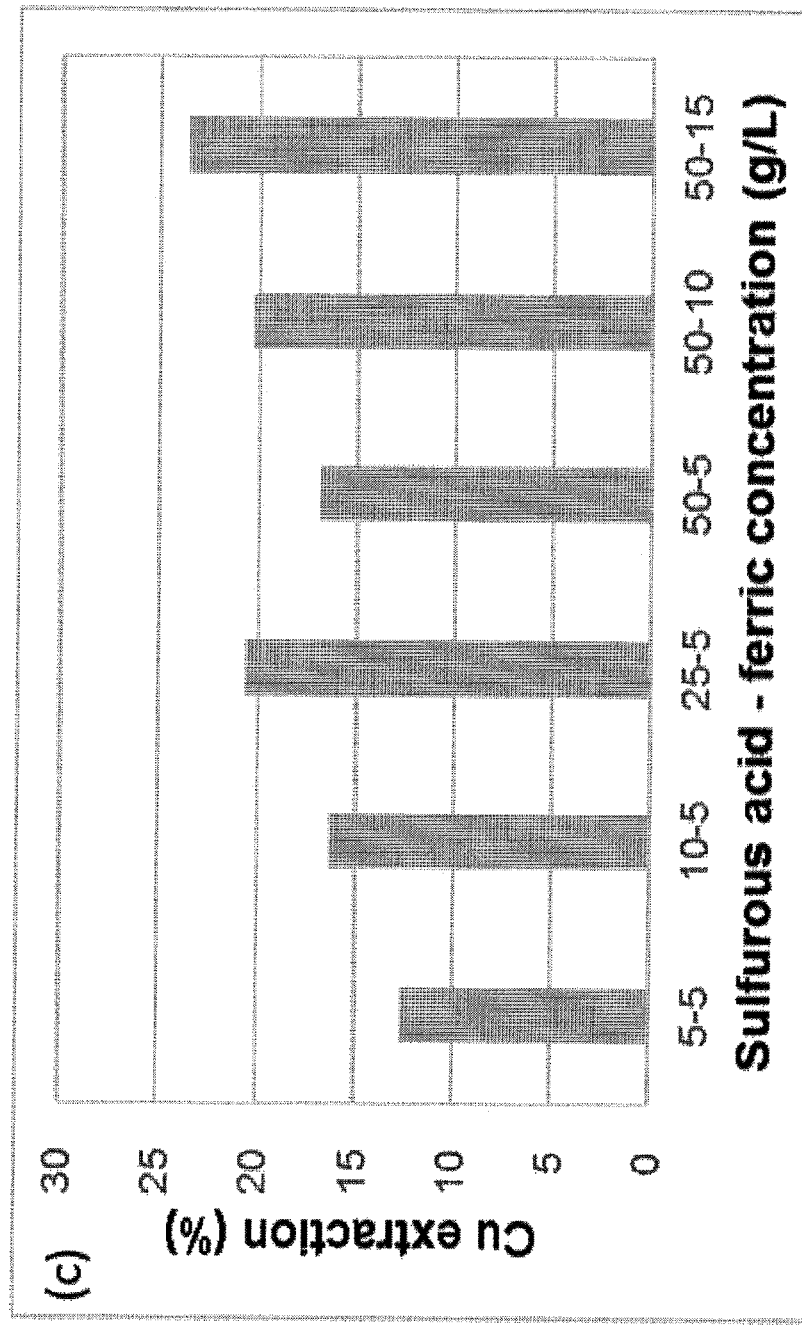
FIG. 1(c). shows copper extraction using sulfurous acid at various concentrations.

Another alternative lixiviant, sulfurous acid was tested at various concentration as shown in FIG. 1(c). Increase of sulfurous acid concentration from 5 to 25 g/L had a positive effect on Cu extraction which increased from 13% to 21%, and it decreased to 17% at 50 g/L sulfurous acid. Ferric concentration exerted positive influence on copper dissolution by showing copper extraction increase from 16% to 24% when ferric increased from 5 g/L to 15 g/L at 50 g/L sulfurous acid.

Figure 2A:
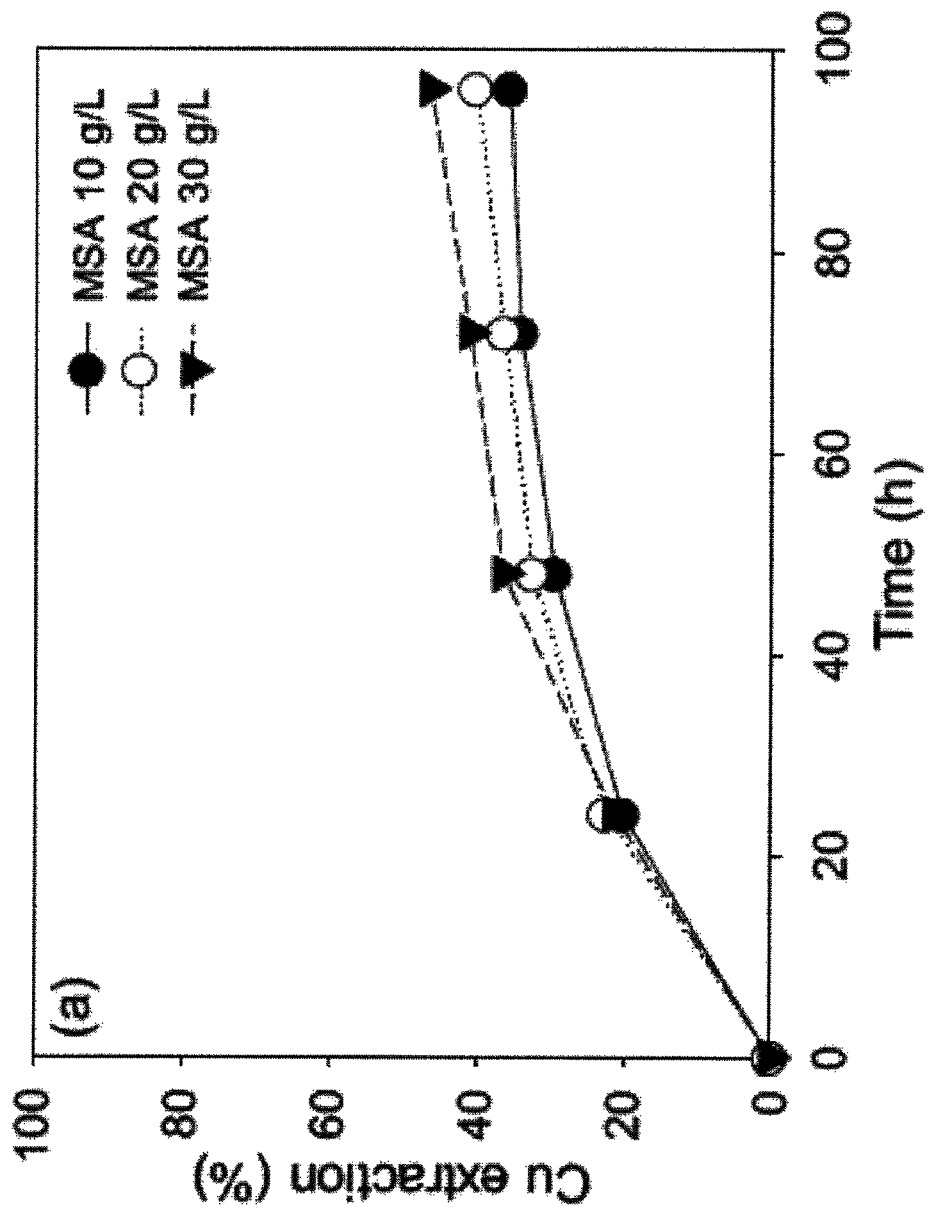
FIG. 2(a) demonstrates the copper extraction for 96 hours by MSA and ferric.

To investigate the kinetic of chalcopyrite leaching, 96 hours leaching tests were conducted with MSA, sulfurous acid and sulfuric acid. FIG. 2(a) demonstrates the copper extraction for 96 hours by MSA and ferric. All the condition showed the increase of copper dissolution until 96 hours. Copper extraction tended to increase from 36% to 40% and 46% by 10, 20 and 30 g/L Methanesulfonic acid with 5 g/L ferric. Therefore, MSA concentration affected significant role in copper dissolution from chalcopyrite and the highest copper extraction was achieved at 30 g/L MSA with 5 g/L ferric.

Figure 2B:
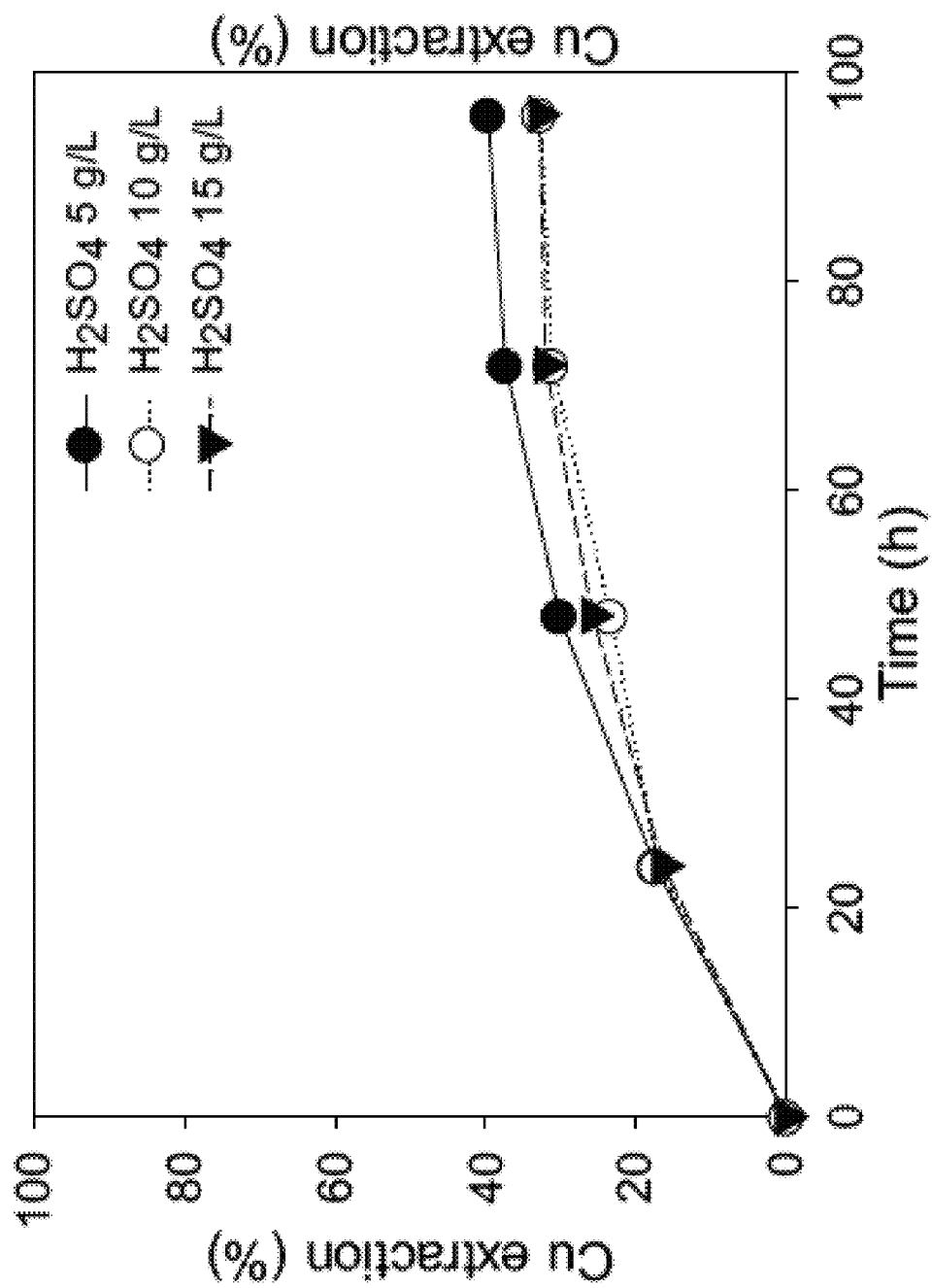
FIG. 2(b) illustrates the kinetic leaching of chalcopyrite by sulfuric acid and ferric for 96 hours.

FIG. 2(b) illustrates the kinetic leaching of chalcopyrite by sulfuric acid and ferric for 96 hours. Copper extraction increased up to 96 hours for all 5, 10 and 15 g/L sulfuric acid added condition. At 96 hours, the highest copper extraction was obtained at 5 g/L sulfuric acid which extracted 39% and followed by 10 (33%) and 15 g/L (33%) which showed the highest value at the lowest acid concentration. Compared to MSA, all the conditions except 5 g/L sulfuric acid (higher value than 10 g/L MSA condition which extracted 36% Cu) showed lower copper recovery. Therefore, MSA tended to extract higher copper dissolution compared to sulfuric acid, a conventional lixiviant.

FIG. 2(c) represents the kinetic result of sulfurous acid with ferric leaching test for 96 hours. All conditions showed the increase of copper extraction within 96 hours. The difference among those conditions showed difference of copper recovery until 24 hours, and the difference became insignificant after 48 hour which means the effect of ferric on sulfurous acid leaching had little influence on copper recovery. The highest copper extraction was about 32% at 50 g/L sulfurous acid with 15 g/L ferric. Compared to other lixiviants, lower copper extraction was shown even though higher acid concentration was applied. The possible explanation can be made by the lower dissolution rate of sulfur dioxide gas in sulfurous acid due to high temperature, which might affect negatively on leaching. Overall, MSA showed the higher copper recovery compared to other leaching agents and 30 g/L MSA was selected for optimal lixiviant concentration.

Figure 3:
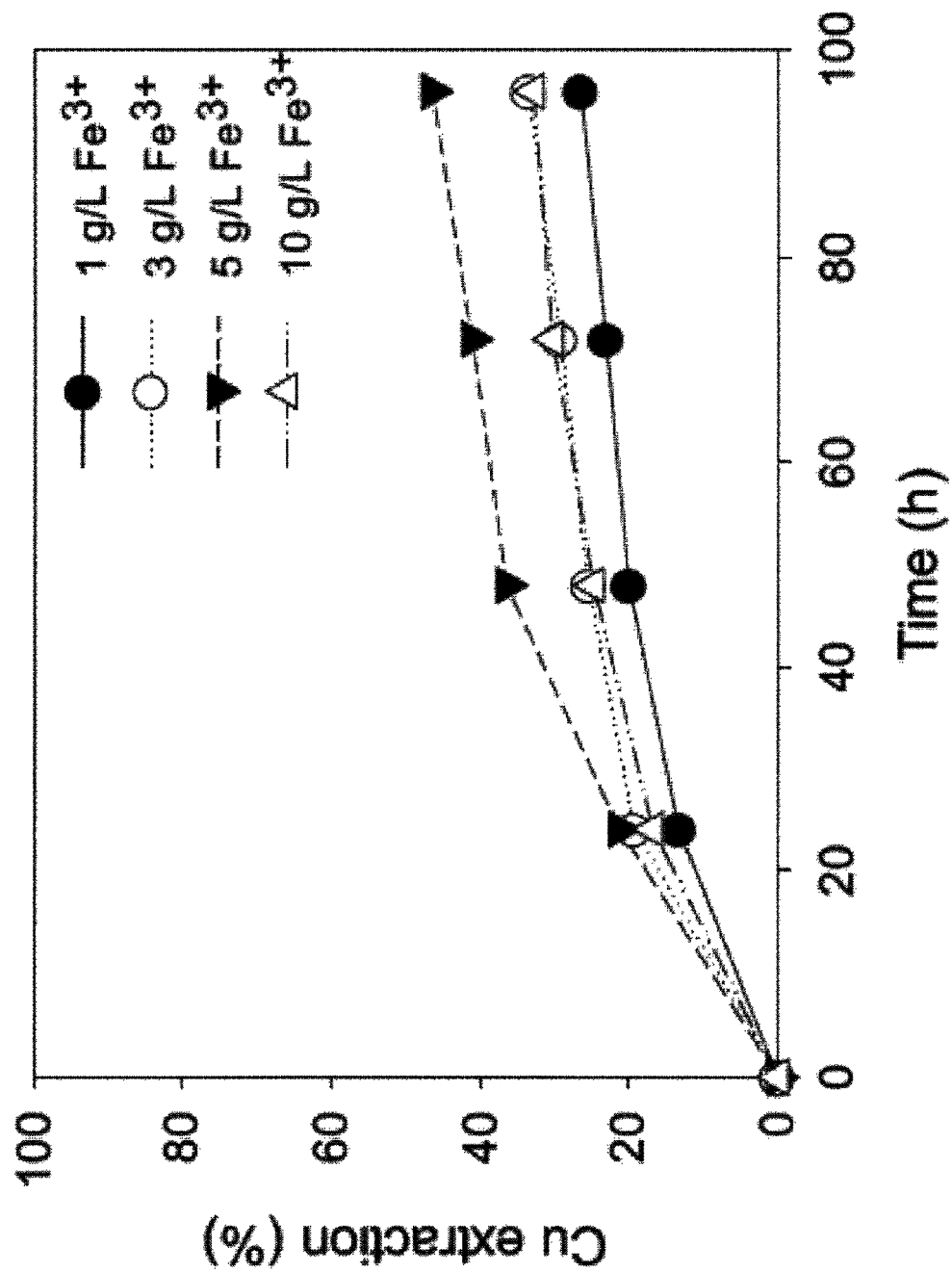
FIG. 3 shows the effect of ferric concentration on copper dissolution.

The effect of an oxidant, ferric was tested at 30 g/L MSA. FIG. 3 demonstrates the effect of ferric concentration on copper dissolution. Copper recovery increased for all condition (1, 3, 5 and 10 g/L ferric at 30 g/L MSA) within 96 hours and the highest copper extraction was achieved at 5 g/L ferric (47%) followed by that of 3 g/L (34%), 10 g/L (33%) and 1 g/L (26%). Less than 5 g/L ferric can be explainable by insufficient oxidant for chalcopyrite leaching with 30 g/L MSA at 75° C. However, 10 g/L ferric, which exceeds double of ferric concentration of the highest copper extraction condition, had negative influence on copper recovery. The possible explanation might be the precipitation of surplus ferric which shows high chemical potential with high $Fe^{3+}/Fe^{2+}$ could render the passivation on chalcopyrite surface as the form of iron oxide or jarosite in acidic and thermal condition. In the literature, conditions higher than 500 mV vs Ag/AgCl extracted lower than 30% compared to lower Eh region (<400 mV vs Ag/AgCl) which extracted above 80% and based on the XRD analysis, iron oxide and jarosite were detected at higher Eh conditions which hinder copper recovery from chalcopyrite. The higher concentration of ferric can both increase solution potential and hydrolysis of ferric for the formation of iron hydroxide which can a nucleus for jarosite might affected negative affect on chalcopyrite leaching. Therefore, the optimum concentration of MSA and ferric for chalcopyrite leaching is at 30 g/L MSA with 5 g/L ferric.

Multi Stage Leaching Test

Figure 4A:
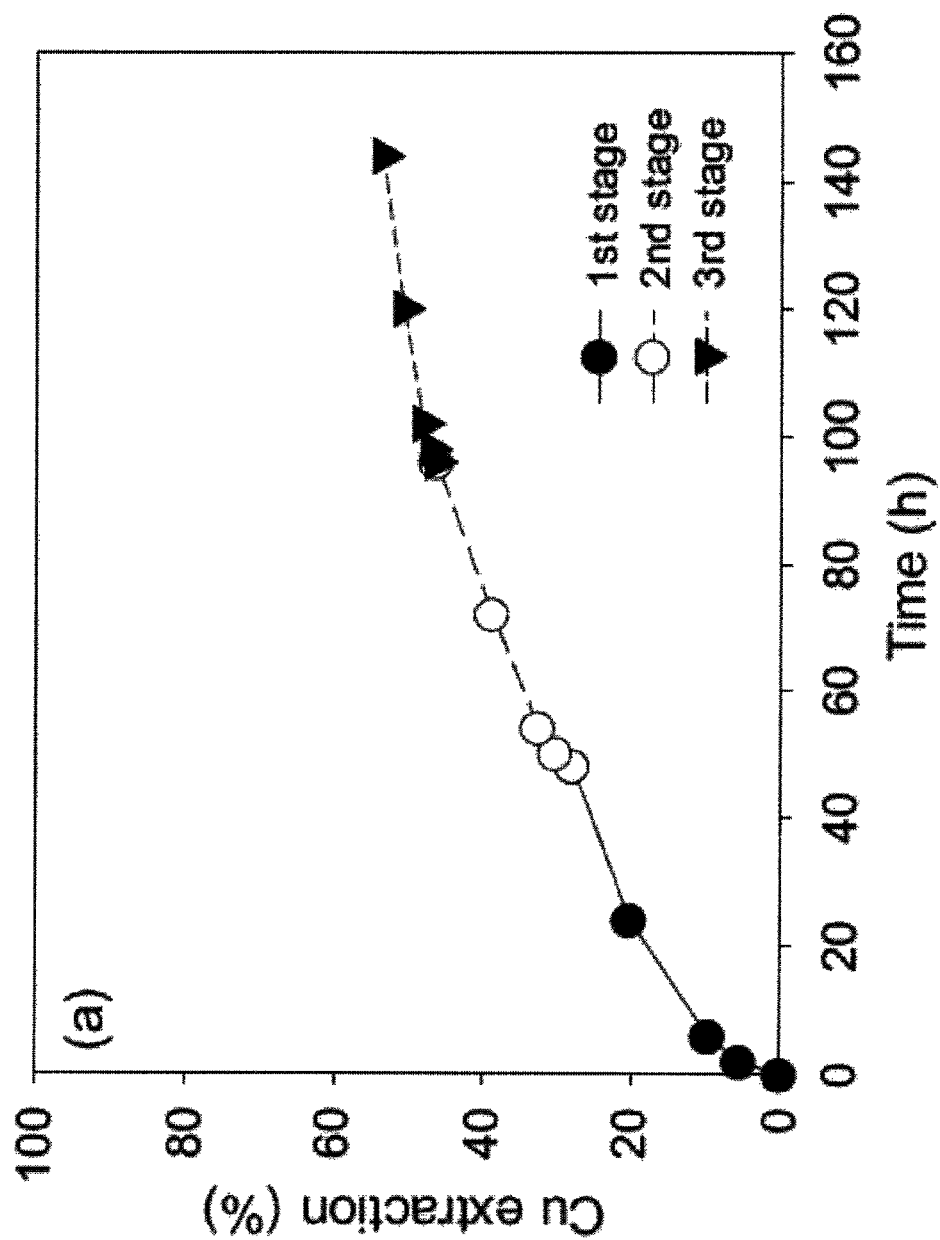
FIG. 4(a) shows that copper was extracted up to 55% at three stages of extraction.
Figure 4B:
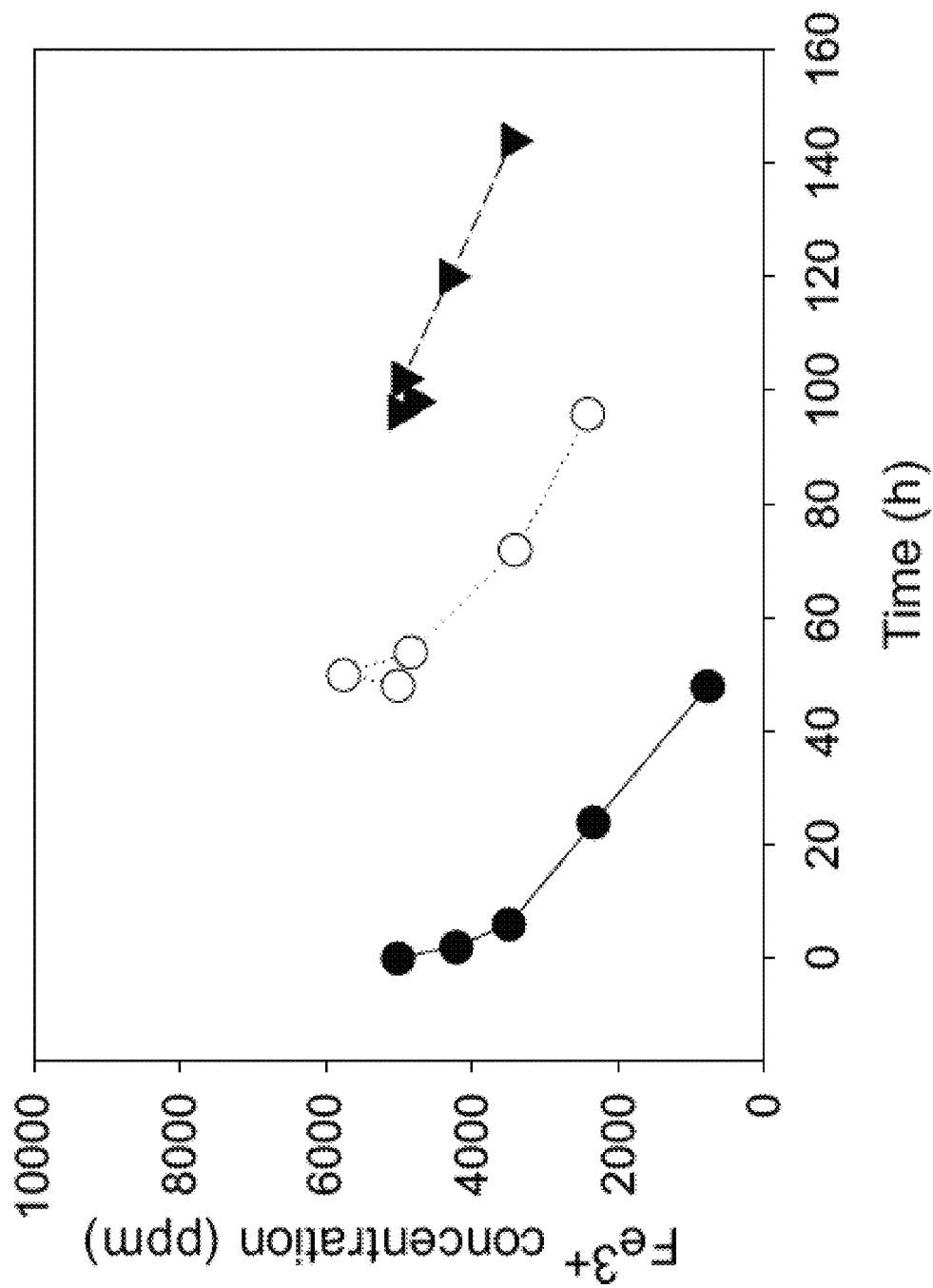
FIG. 4(b) illustrates that the kinetic of ferric ion in leachate tended to decrease.

Multistage leaching test was carried out to analyze the amount of copper can be leached from chalcopyrite by MSA and ferric medium. A fresh lixiviant (30 g/L MSA) and an oxidant (5 g/L ferric) were replaced from 48 hours tested leachate for several times until copper extraction did not show further increase. The result illustrated in FIG. 4(a) showed that copper was extracted up to 55% at three stages of extraction. From first to third stage, the kinetic of copper extraction decreased as 30% of copper from first stage, 18% from second stage and 7% from third stage. The ferric concentration illustrated (FIG. 4(b)) illustrated that the kinetic of ferric ion in leachate tended to decrease. The consumption of ferric decrease as phase changing, which finally can explain the kinetic of three stages leaching of chalcopyrite. Therefore, 55% of copper from chalcopyrite concentrate was able to be dissolved by MSA and ferric medium, so further studies to enhance Cu recovery were carried out by the replacement of oxidant from ferric to hydrogen peroxide.

Copper Extraction with MSA and Hydrogen Peroxide as an Oxidant

Figure 5A:
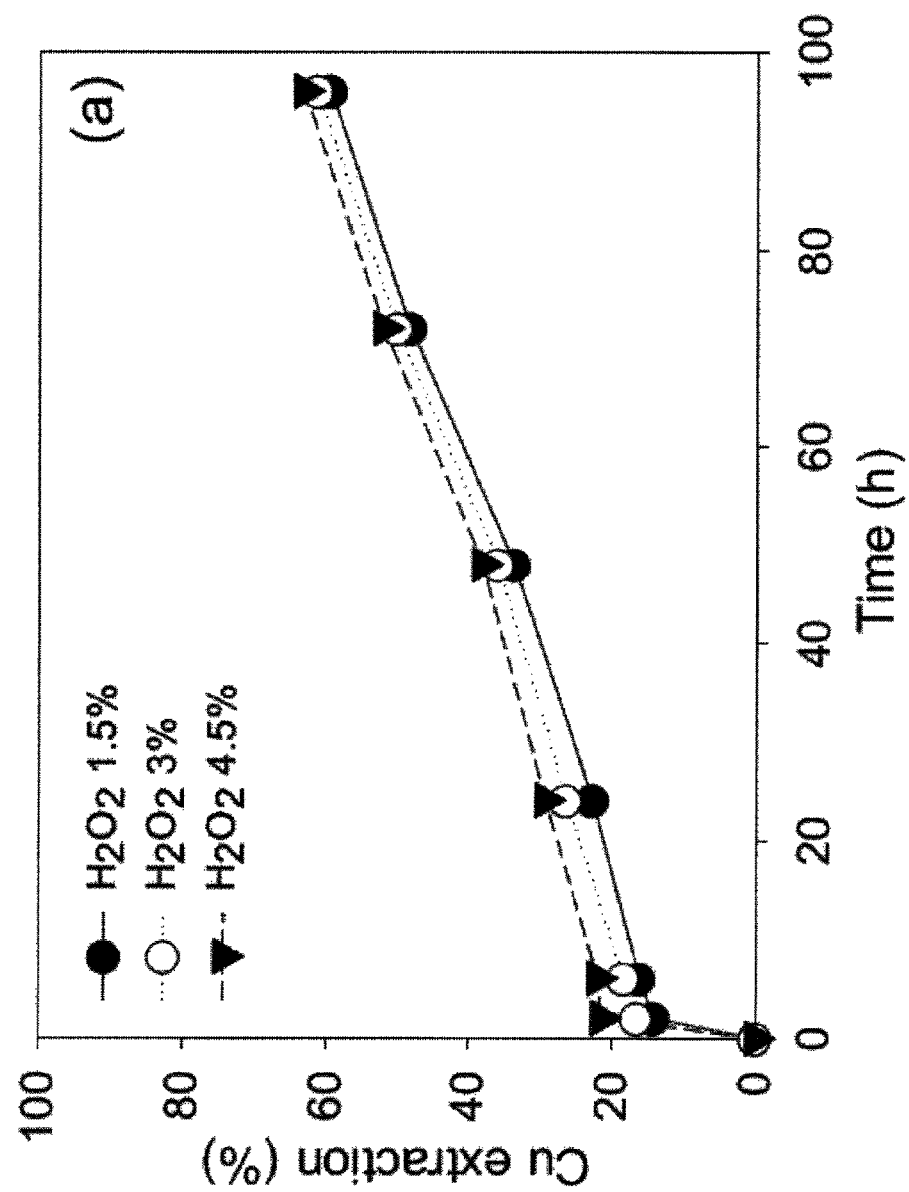
FIG. 5(a) represents the result of chalcopyrite leaching test when hydrogen peroxide is applied as an oxidant.

Hydrogen peroxide was used as an alternative oxidant to increase copper extraction from chalcopyrite with 30 g/L MSA. FIG. 5(a) represents the result of chalcopyrite leaching test when hydrogen peroxide is applied as an oxidant. Copper recovery increased within 96 hours for all condition up to 59%, 61% and 63% when 1.5%, 3.0% and 4.5% hydrogen peroxide (v/v) were added respectively. Compared to ferric leaching which extracted 47%, higher copper extraction achieved about 60%. In spite of higher molarity of hydrogen peroxide (1.5% hydrogen peroxide—0.64 mol/L) than ferric (0.09 mol/L), considering that the inhibition of Cu recovery higher than 0.09 M of ferric, it is possible to state that hydrogen peroxide performs better Cu dissolution as an oxidant. By titration of hydrogen peroxide (data not shown), the concentration of the oxidant decreased within 2 hours. Therefore, periodical addition of hydrogen was carried out for further copper extraction from chalcopyrite concentrate.

Figure 5B:
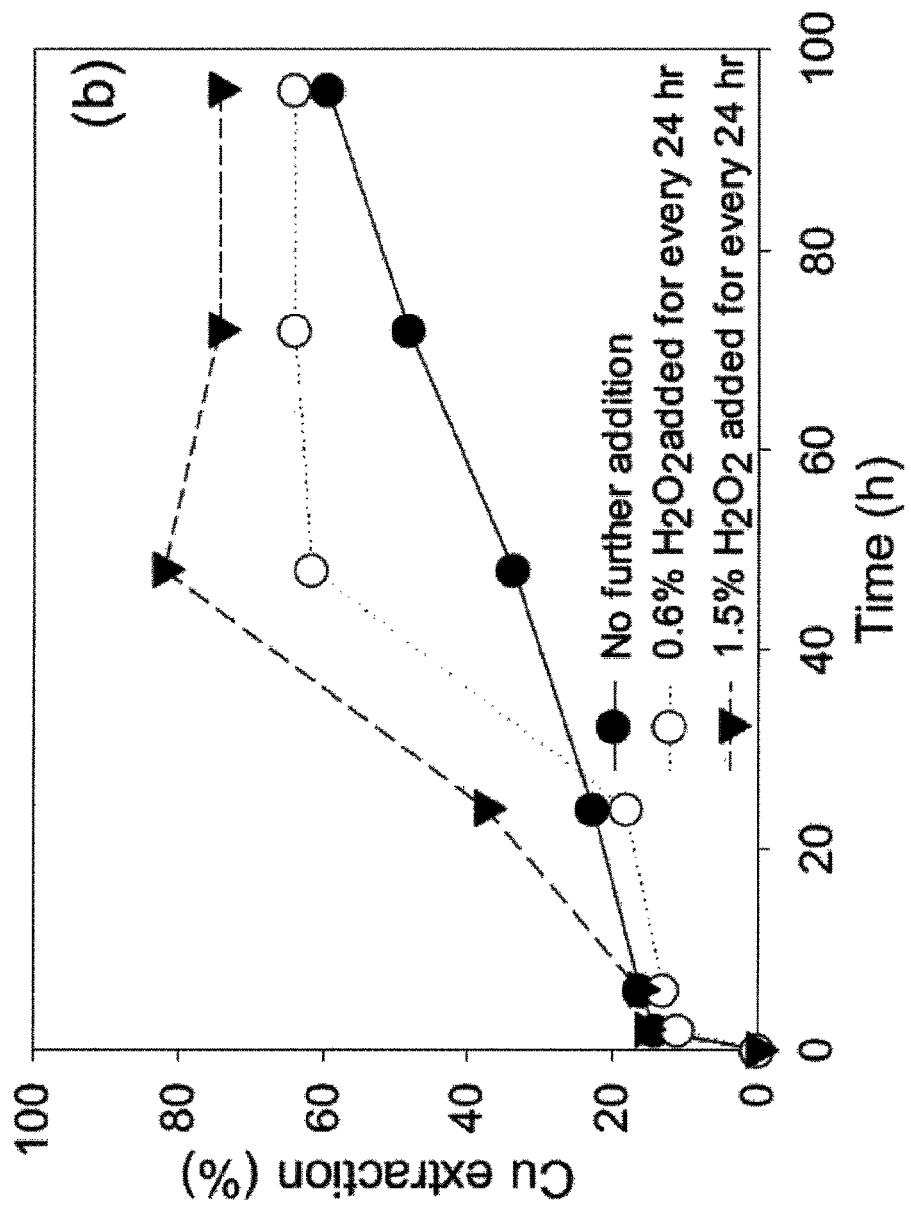
FIG. 5(b) illustrates the results of periodic addition of hydrogen peroxide at a rate of every 24 hours.

The result of periodical addition of hydrogen peroxide for every 24 hours is demonstrated in FIG. 5(b). The additional injection of hydrogen peroxide enhanced copper extraction up to 48 hours. The slope between 24 and 48 hour shows the significant difference between additional hydrogen peroxide injection and no addition. This significant difference can be explainable by the oxidation of ferrous leached from chalcopyrite into ferric, which can function as an additional oxidant for chalcopyrite leaching. By addition of hydrogen peroxide every 24 hours, both hydrogen peroxide and ferric oxidized from ferrous roles as oxidants which can enhance copper dissolution from chalcopyrite. The amount addition of hydrogen peroxide at every 24 hours showed that higher addition (1.5%) achieved more copper extraction (75%) than 0.6% periodical addition (69%) followed by no further addition (59%). The kinetic of periodical added conditions showed that leaching occurred up to 48 hours and no copper dissolution occurred. The periodical addition of hydrogen peroxide enhanced kinetic of copper leaching but inhibited further copper dissolution. Therefore, the effect of MSA concentration and hydrogen peroxide concentration was studied to increase copper recovery.

Figure 6A:
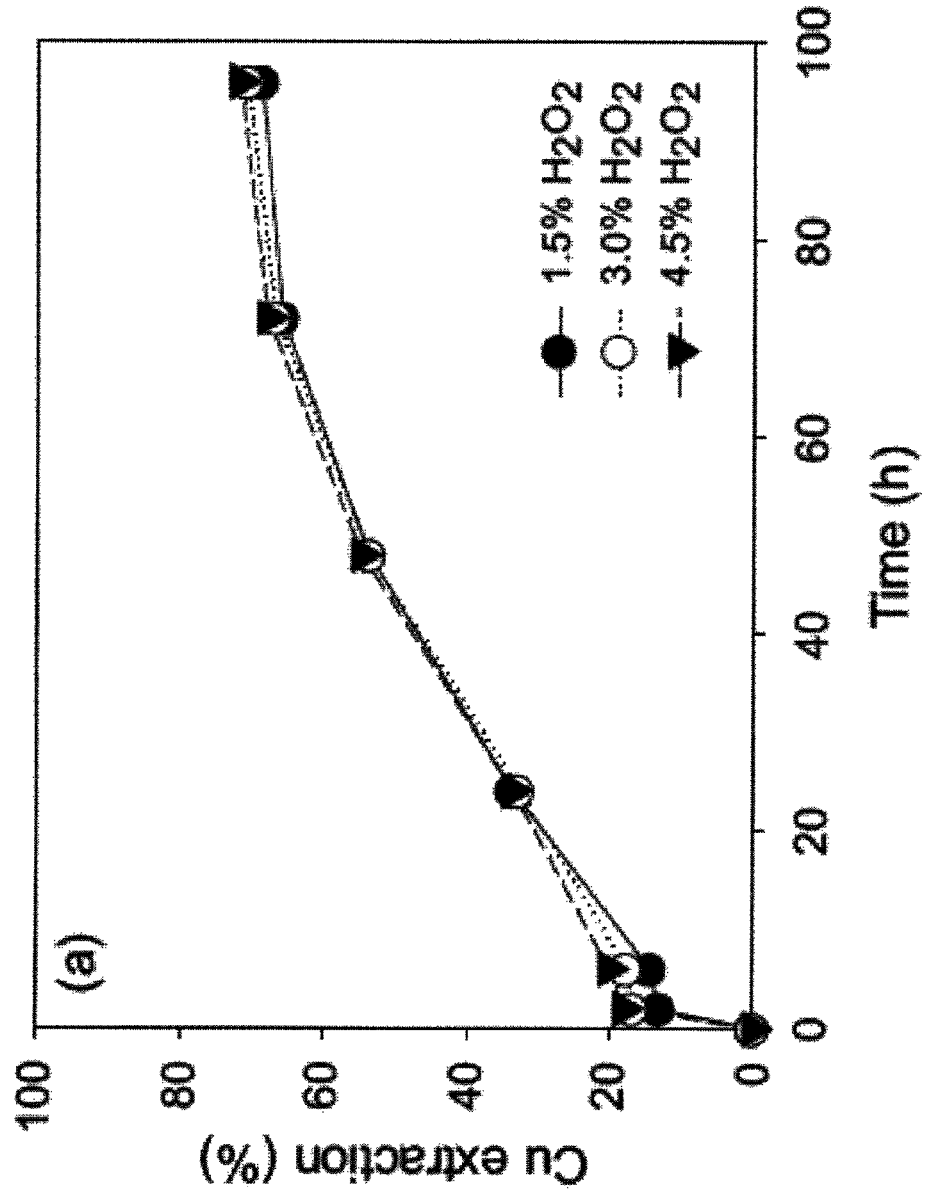
FIG. 6(a)-(c) illustrates the effect of MSA concentration on chalcopyrite leaching when hydrogen peroxide was used as an oxidant.
Figure 6B:
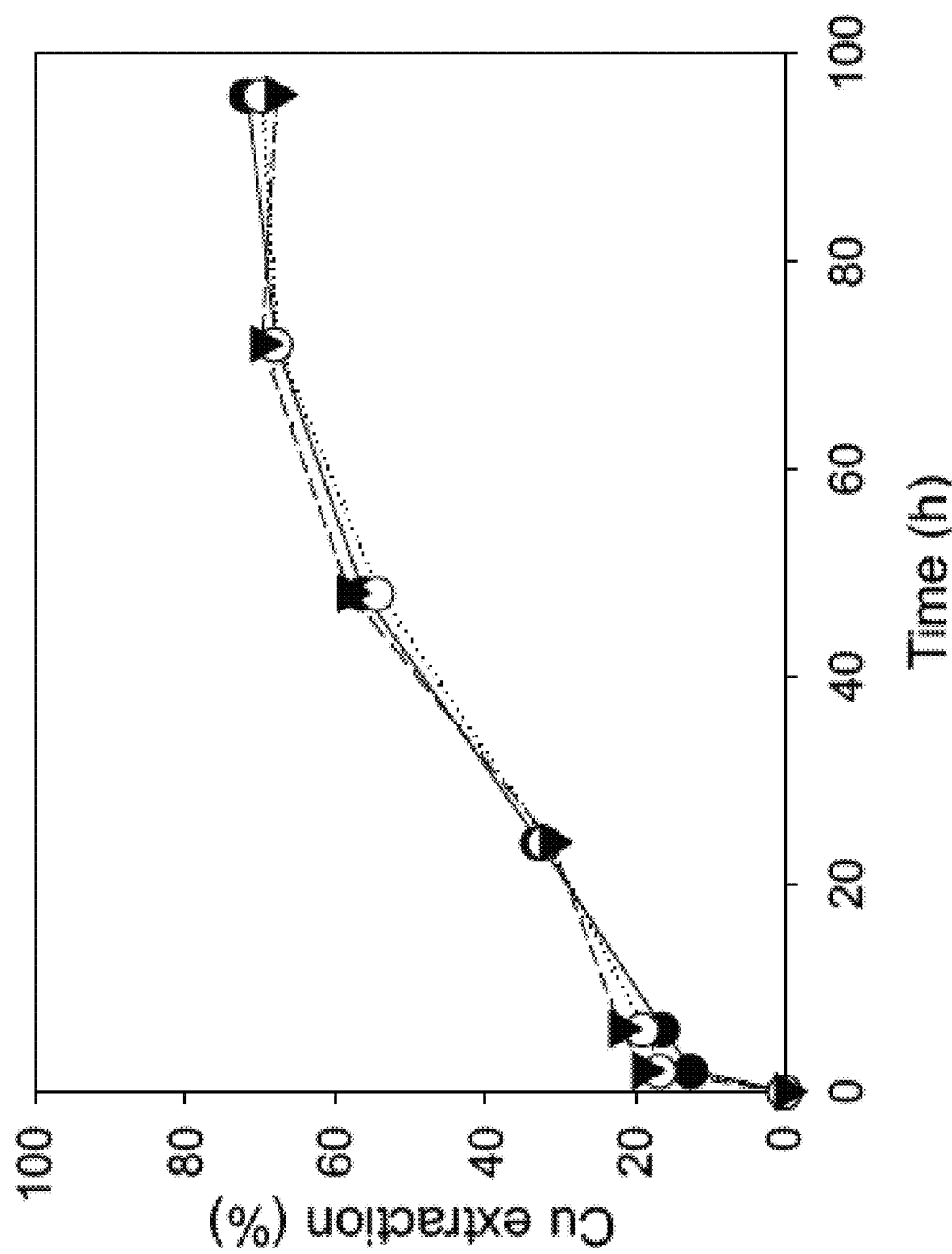
Figure 6C:
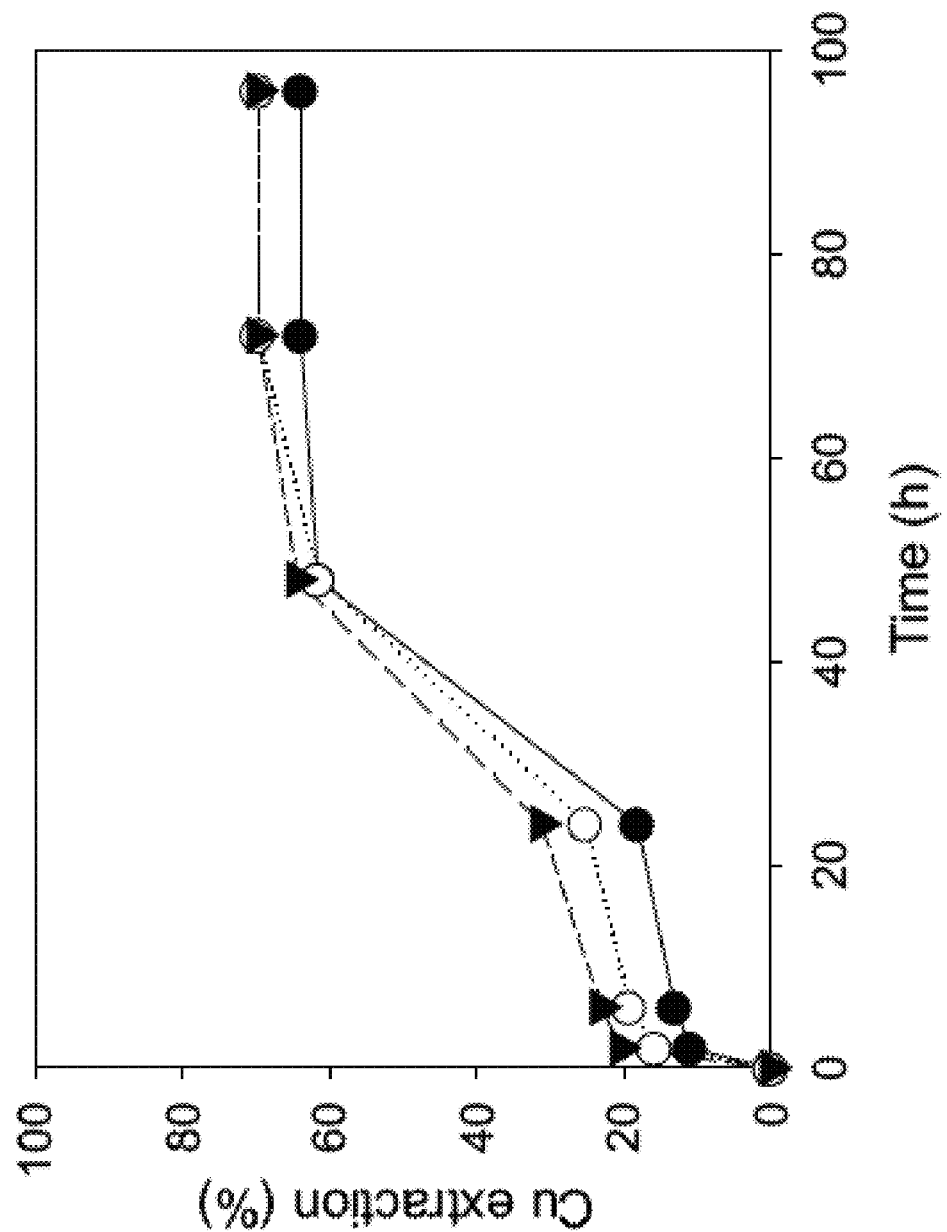

FIG. 6(a)-(c) illustrates the effect of MSA concentration on chalcopyrite leaching when hydrogen peroxide was used as an oxidant. When the concentration of MSA was set from 10 to 20 and 30 g/L with hydrogen peroxide addition about 1.5, 3.0 and 4.5%, all the condition achieved around 70% of copper extraction within 96 hours, which showed insignificant difference. The concentration of MSA did not show any positive effect on copper dissolution. However, it affected the kinetic of leaching. As the concentration of MSA increased from 10 to 20 and 30 g/L, the time for maximum copper extraction decreased from 96 to 72 and 48 hours. Therefore, the concentration of MSA enhanced kinetic of chalcopyrite leaching, but it showed less significant in copper recovery.

Effect of Hydrogen Peroxide Concentration

Figure 7:
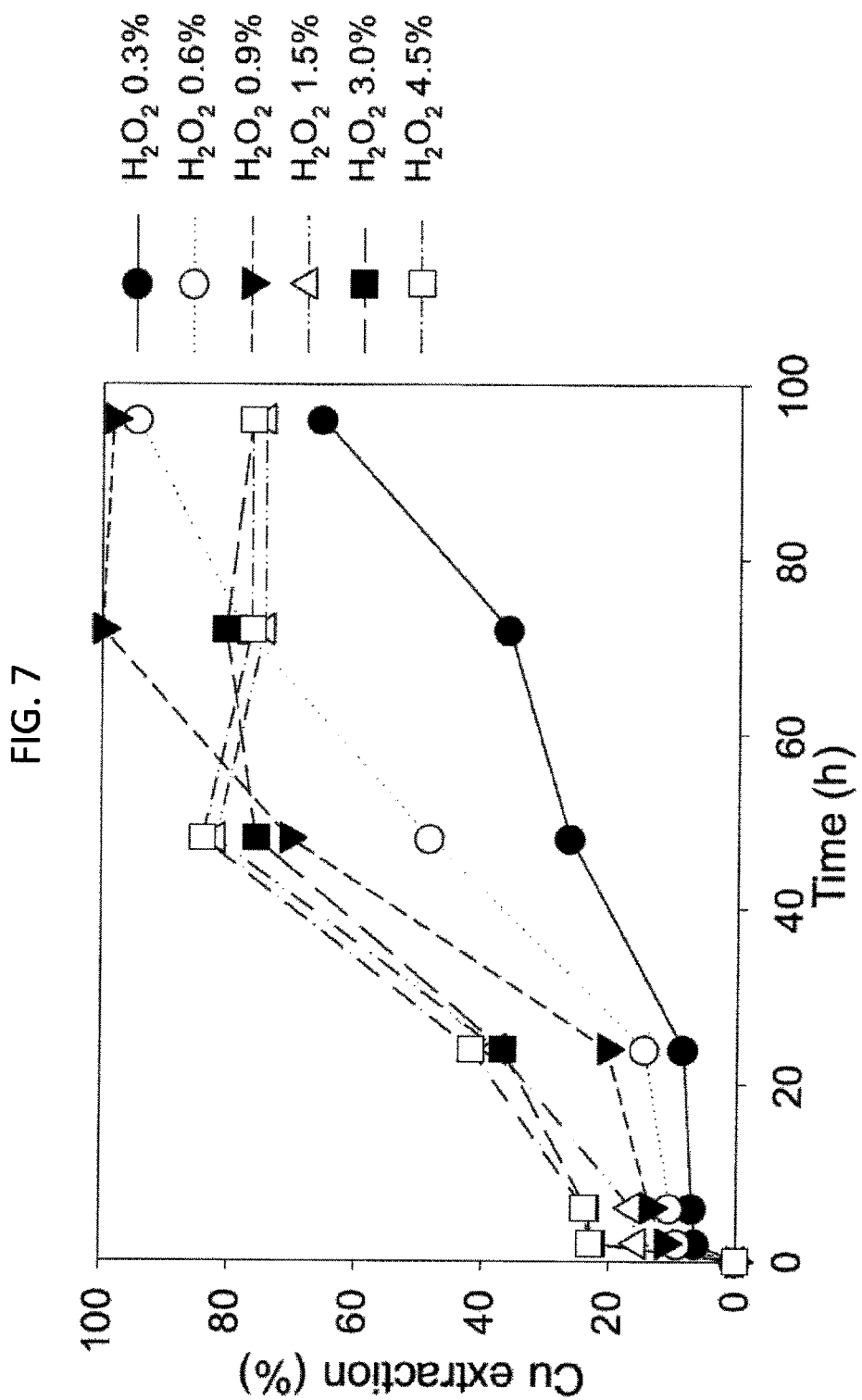
FIG. 7 illustrates the results of changing the concentration of hydrogen peroxide from 0.3 to 4.5% with the same amount of periodical addition for every 24 hours at 30 g/L MSA.

The concentration of hydrogen peroxide was changed from 0.3 to 4.5% with the same amount of periodical addition for every 24 hours at 30 g/L MSA. The result in FIG. 7 illustrated that copper extraction increased within 96 hours at 0.3 and 0.6%, 72 hours at 0.9% and 48 hours at 1.5, 3.0 and 4.5%. The kinetic to show maximum copper extraction was faster when the higher amount of hydrogen peroxide was added. However, the copper recovery did not increase by the quantity of hydrogen peroxide addition. The final copper extraction increased from 61% to 94% and 100% when hydrogen peroxide was periodically added at every 0.3, 0.6 and 0.9%, respectively at 75° C. Higher addition than 0.9% did not enhance copper recovery as 1.5, 3.0 and 4.5% conditions showed 75% for all conditions, which means higher hydrogen peroxide might not be advantageous for copper extraction. The periodical addition of hydrogen peroxide can increase Cu recovery from chalcopyrite by the oxidation of ore itself and the oxidation of ferric from extracted ferrous, which can be used as an oxidant. Lower Cu extraction at lower addition of hydrogen peroxide than 0.9% can be understandable by the insufficient oxidant for chalcopyrite leaching. However, higher addition than 0.9% which showed lower Cu recovery was still questionable. One of possibility for this phenomenon could be explained by the highly increase of Eh (>700 mV vs Ag/AgCl in this study after 48 hours hydrogen peroxide addition) and ferric concentration by the periodical addition of hydrogen peroxide in thermal condition which could lead passivation of chalcopyrite. As shown in Cordoba's literature above, highly oxidized condition with high concentration of ferric could form iron oxide and jarosite, and this phenomenon finally could inhibit dissolution of chalcopyrite surface. Therefore, the optimal condition for MSA and hydrogen peroxide can be 30 g/L MSA and 0.9% hydrogen peroxide 24 hourly periodically added condition.

Effects of Pulp Density

Figure 8:
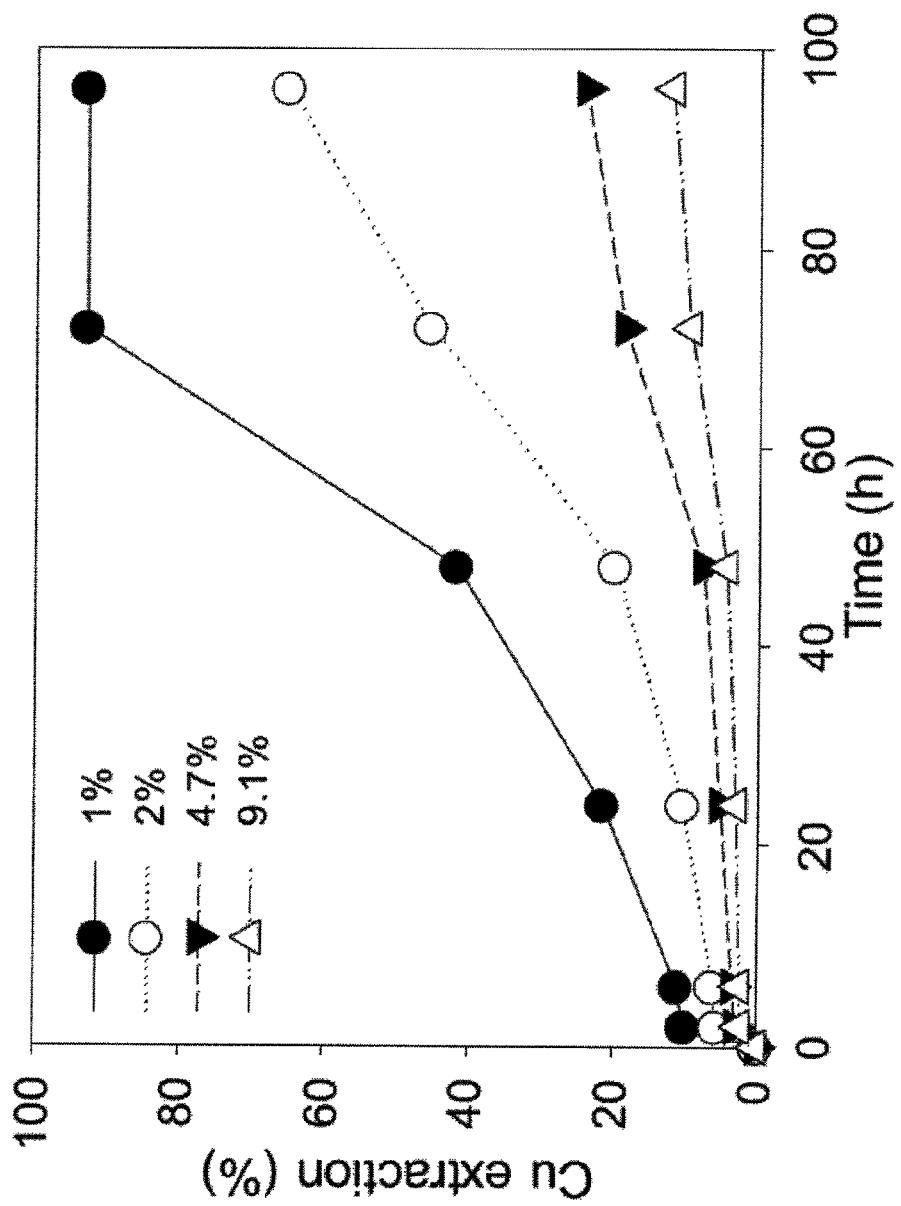
FIG. 8 illustrates the effect of pulp density at 1, 2, 4.7, and 9.1%.

The effect of pulp density was studied at 1, 2, 4.7, 9.1% as shown in FIG. 8. The highest copper extraction was obtained at 1% condition, extracting 95% of copper from chalcopyrite, followed by 2% (65%), 4.7% (24%), 9.1% (12%). The concentrations of copper dissolved in each condition were about 2600 mg/L, 3600 mg/L, 3300 mg/L and 3300 mg/L for 1, 2, 4.7 and 9.1%, respectively. As the tests were carried out in 30 g/L MSA at 100 ml solution in beaker, mol of MSA in solution was 0.031 mol for all conditions with hydrogen peroxide 0.152 mol due to 24 hours periodical addition of 0.038 mol (0.9% (v/v)) for each time. 0.0043 mol of copper was associated in 1 g of chalcopyrite based on elemental analysis and it increased by 0.0086, 0.0215 and 0.043 mol by pulp density from 1 to 2, 4.7 and 9.1%. Based on copper concentration in each test, the result showed that 0.0041 mol of copper was extracted from chalcopyrite containing 0.0043 mol of copper by 0.031 mol of MSA with 0.152 mol of hydrogen peroxide at 1% pulp density. At 2, 4.7 and 9.1% pulp density, 0.0055, 0.005 and 0.005 mol of copper was recovered from 0.0086, 0.0215 and 0.043 mol of copper in chalcopyrite with the same amount of mol of MSA and hydrogen peroxide. The highest amount of mole recovered from chalcopyrite was 0.0055 mol at 2% pulp density. 1% pulp density showed lower mole number of copper due to insufficient chalcopyrite feeding in the reaction. Higher than 2% pulp density extracted the same moles of copper, which means sufficient MSA and hydrogen peroxide are required to enhance copper recovery at higher pulp density.

Effects of Temperature

Figure 9A:
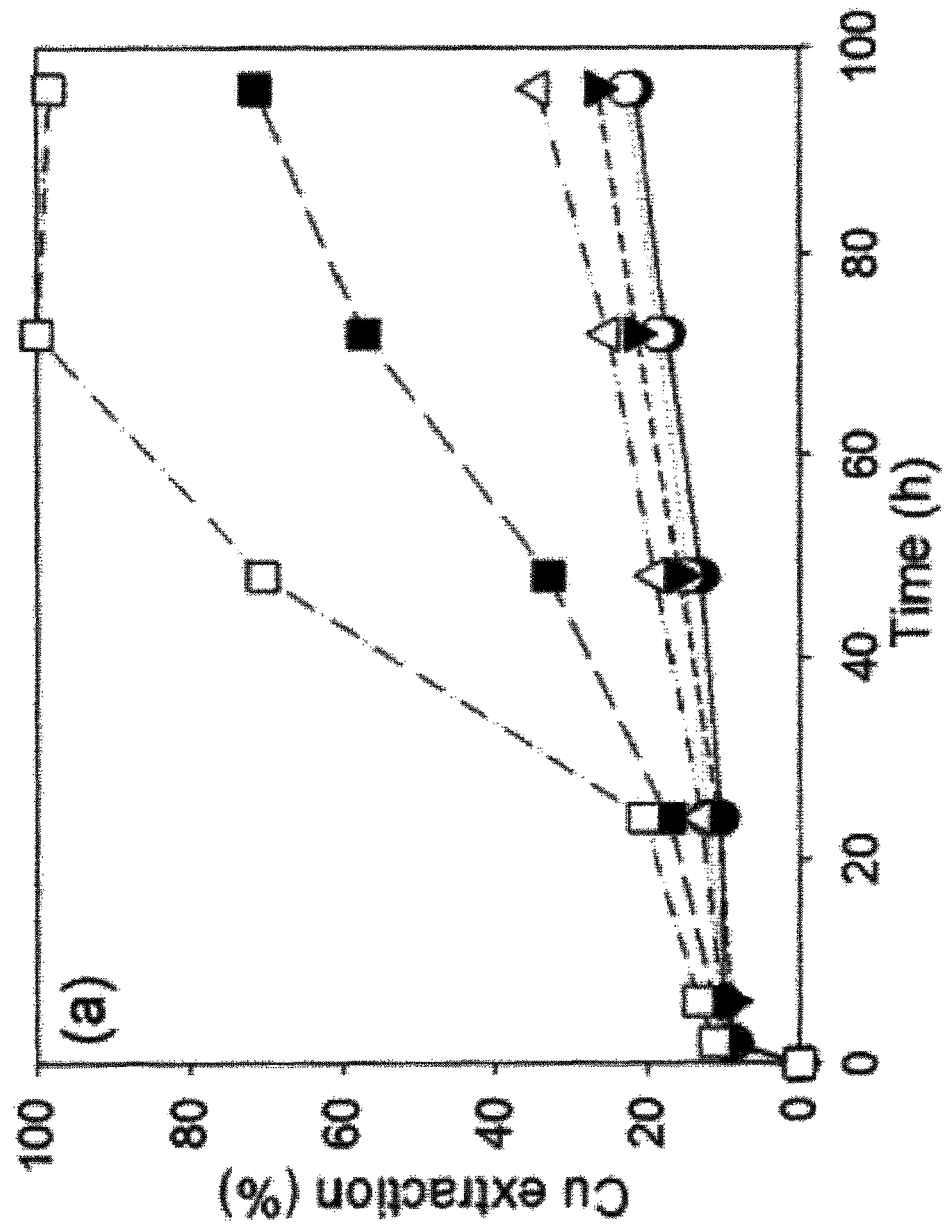
Figure 9B:
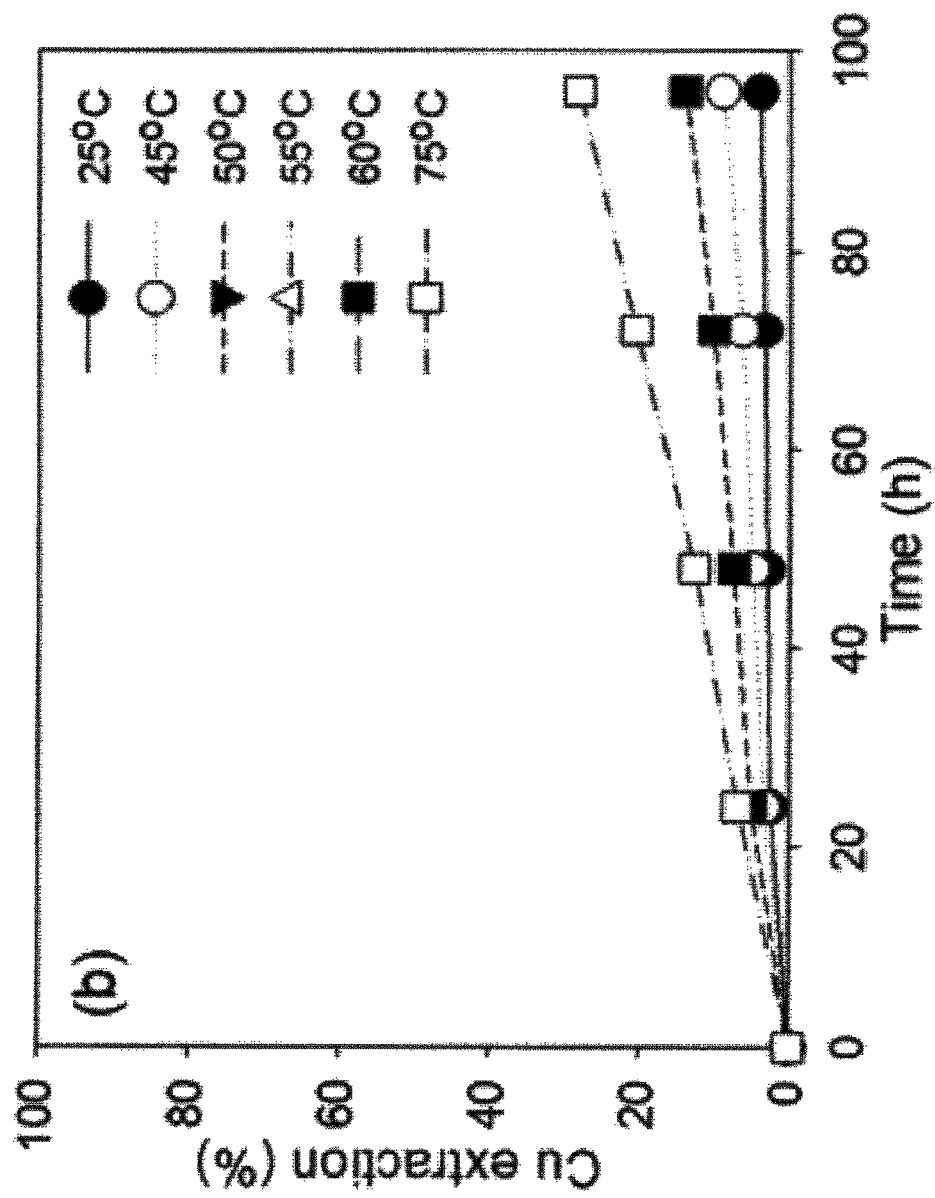
Figure 9D:
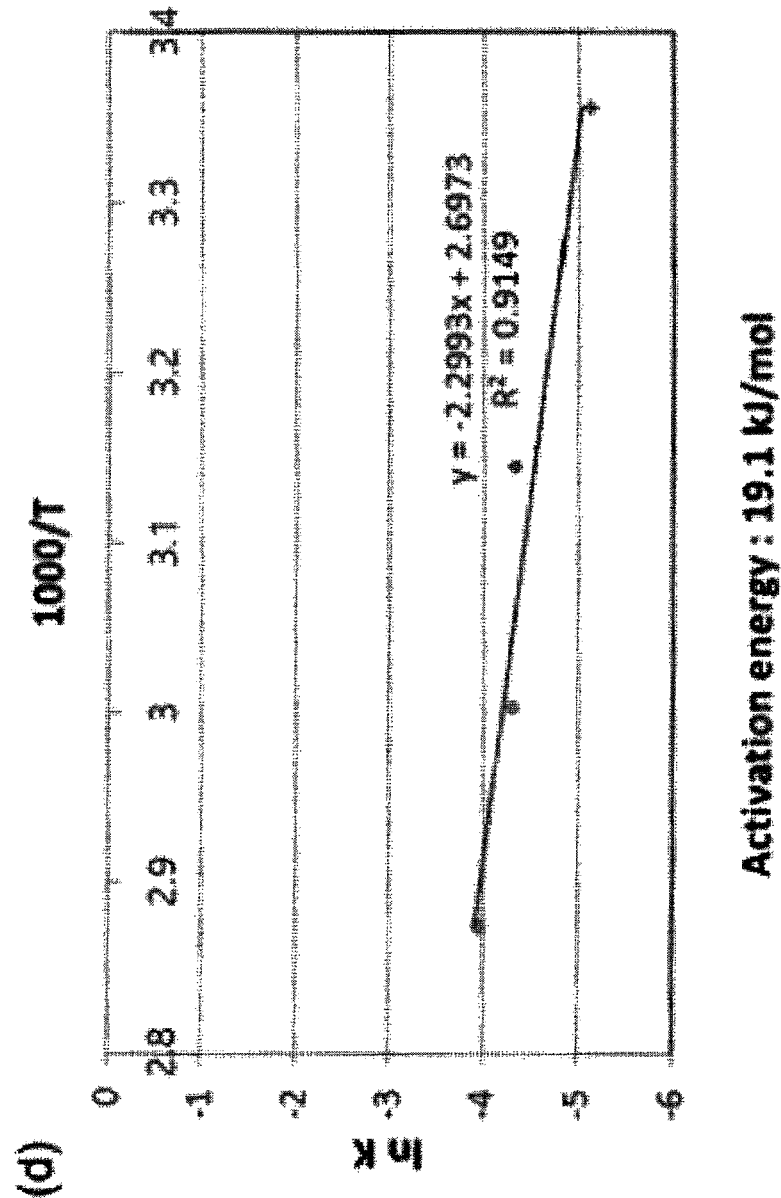
Figure 10:
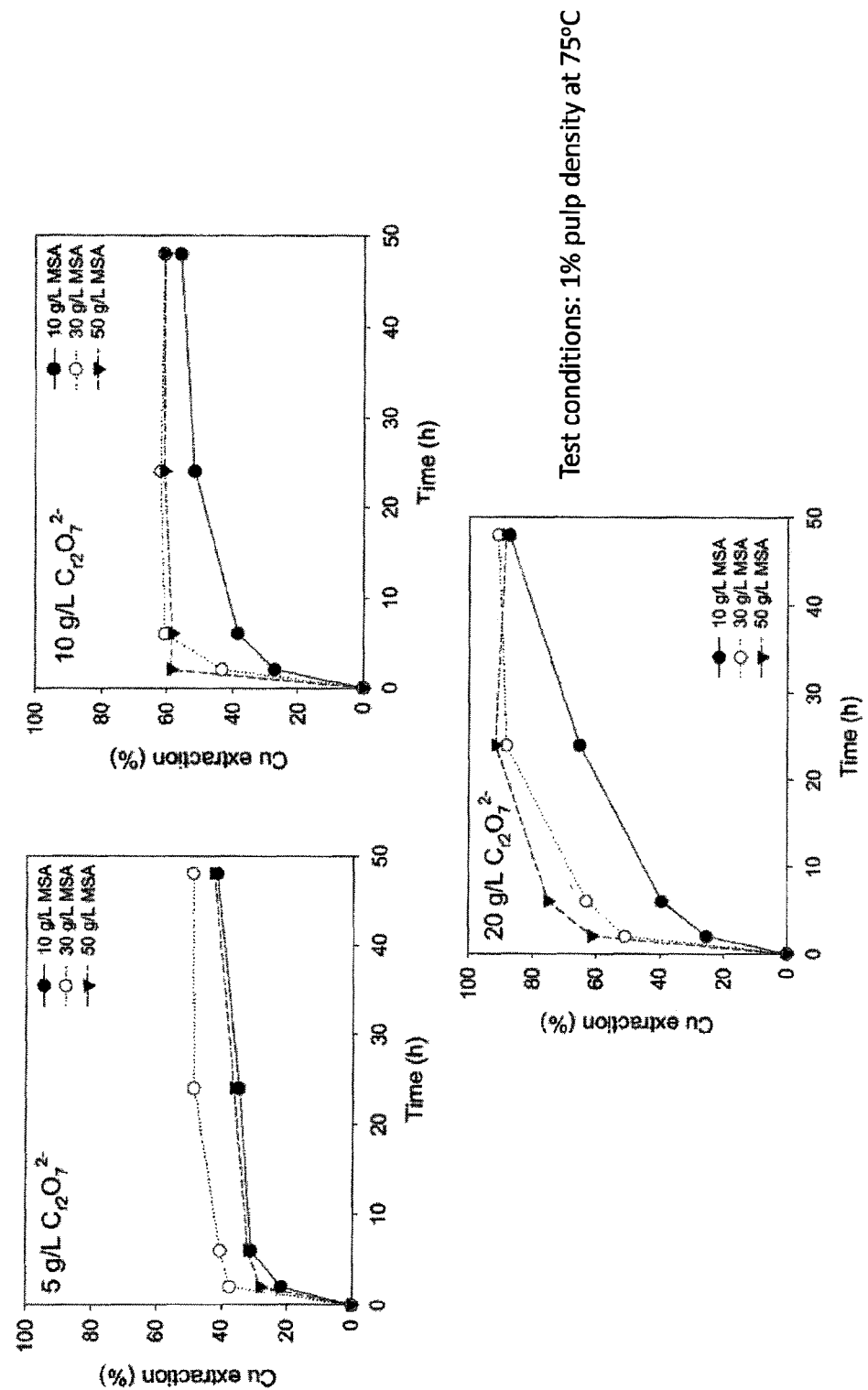
FIG. 10 illustrates the effect of MSA concentration on copper extraction when various exemplary concentrations of dichromate were used as an oxidant.
Figure 11:
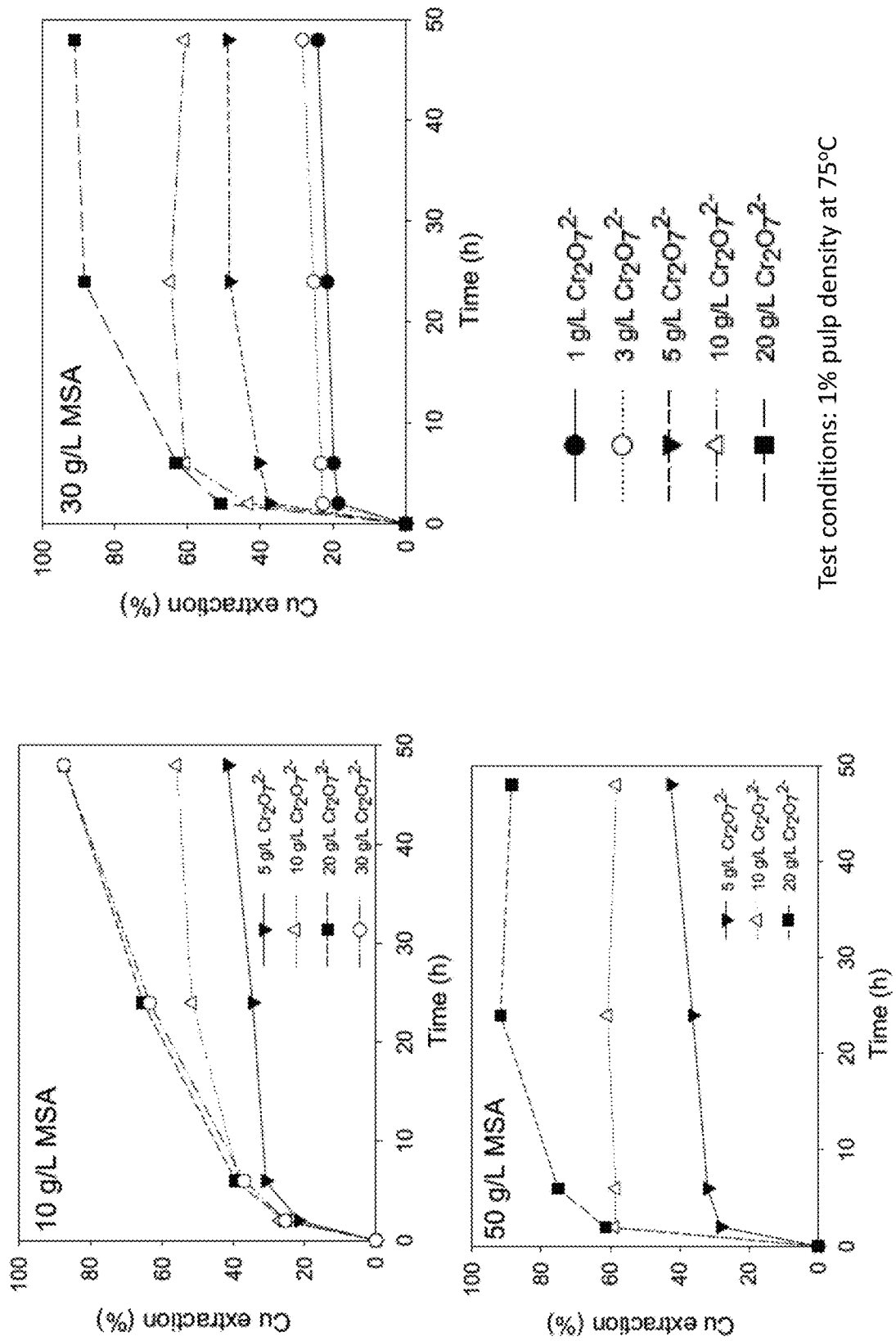
FIG. 11. illustrates the effect of oxidant concentration illustrates the results of changing the concentration of dichromate (oxidant)
Figure 12:
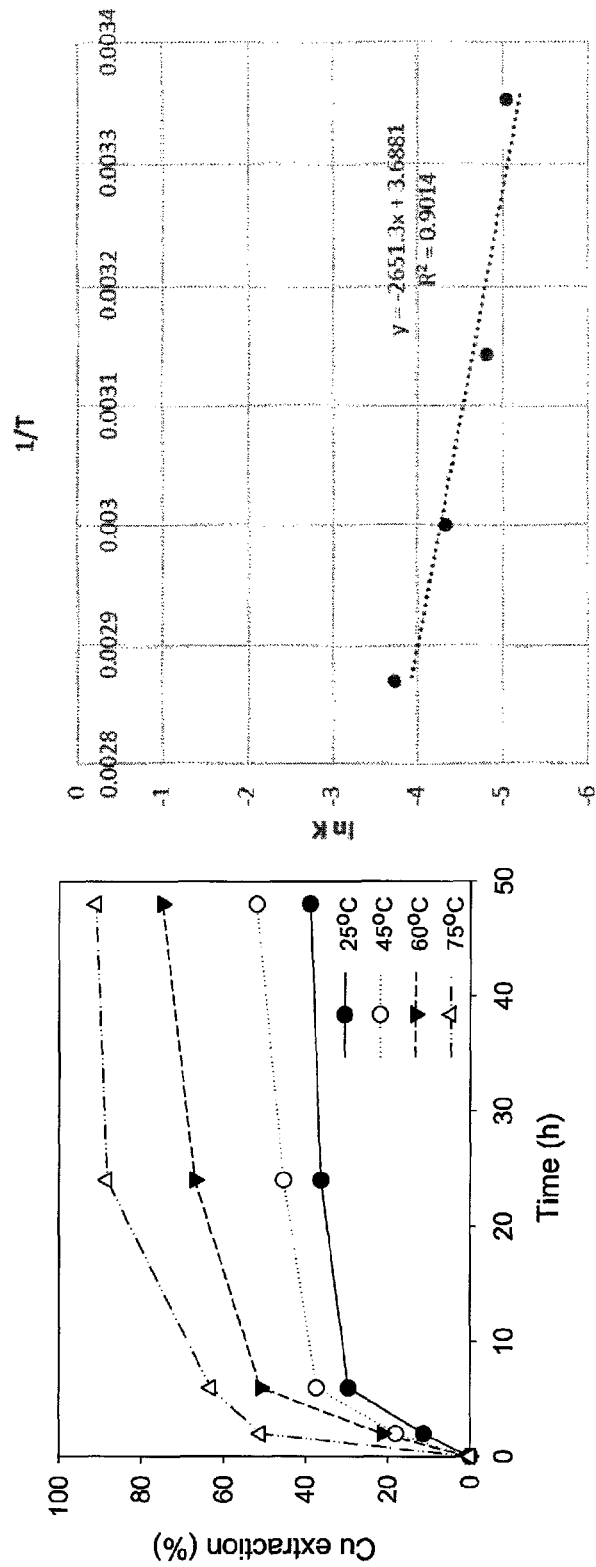
FIG. 12 illustrates the effect of temperature on copper extraction when dichromate is used as oxidant.
Figure 13:
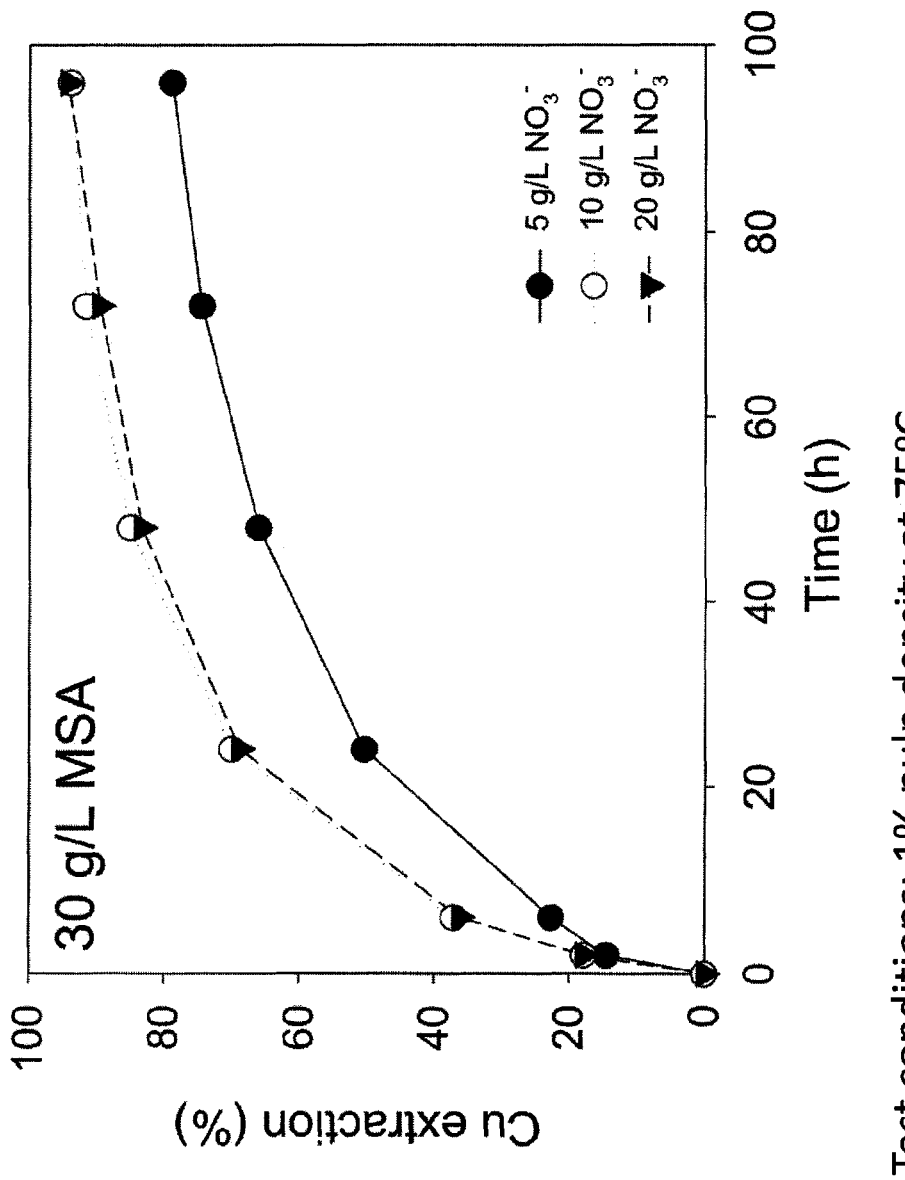
FIG. 13. illustrates the effect of oxidant concentration (i.e., nitrate oxidant)

FIG. 9(a)-(d) shows the effect of temperature on chalcopyrite leaching when MSA and hydrogen peroxide were used with the comparison of 5 g/L sulfuric acid (which showed the best copper extraction in FIG. 2(b)) and the same amount of hydrogen peroxide as a baseline. As illustrated in FIG. 9(a), the increase of temperature from 25° C. to 45, 50, 55, 60 and 75° C. enhanced copper extraction from 22% to 23, 27, 35, 71, and 100% within 96 hours. The increase of temperature showed the significant difference between 55° C. and 60° C. as the Cu dissolution increased from 35 to 71%. Compared to MSA, 5 g/L sulfuric acid with hydrogen peroxide showed lower copper extraction when increasing temperature from 25° C. (4%) to 45 (9%), 60 (14%) and 75° C. (28%) which showed the improvement of copper leaching by MSA. Analysis of Arrhenius plot and the calculation of activation in FIG. 9(c) and FIG. 9(d) showed that 39.9 kJ/mol and 19.1 kJ/mol were obtained when 30 g/L MSA and 5 g/L sulfuric acid with hydrogen peroxide were used for chalcopyrite leaching, respectively. These reactions can be explained as surface chemical-controlled reaction, which means that the temperature is the most important factor for the achievement of kinetic increase. Compared to activation energy obtained from other literatures such as using sulfuric acid with ferric chloride as an oxidant (40-60 kJ/mol) and with ferric sulfate (60-80 kJ/mol), lower activation energy was achieved in this study (39.9 kJ/mol). This can explain the higher performance of MSA and hydrogen peroxide for chalcopyrite leaching compared to sulfuric acid and ferric medium.

We claim:

1. A method of extracting copper from a copper sulfide mineral comprising contacting said copper sulfide mineral with an alkylsulfonic acid and optionally a peroxide, a dichromate salt, or a nitrate salt, or a combination thereof, wherein the peroxide is chosen from the group consisting of hydrogen peroxide and metal peroxide.

2. The method of claim 1, wherein said copper sulfide mineral is Chalcopyrite ($CuFeS_2$), Covellite (CuS), Chalcocite ($Cu_2S$), Enargite ($CuAsS_4$), Bornite ($Cu_5FeS_4$), or Digenite ($Cu_9S_5$).

3. The method of claim 1, wherein said peroxide is in contact with copper ore for about 24 to about 96 hours.

4. The method of claim 1, wherein said peroxide is added to said copper sulfide mineral or said copper concentrate periodically at a rate of about every 24 hours for up to about 48 hours to about 96 hours.

5. The method of claim 1, wherein said peroxide is present in a concentration of about 0.3 to about 15% (v/v) peroxide.

6. The method of claim 1, wherein said peroxide is present in a concentration of about 0.3 to about 4.5% (v/v) peroxide.

7. The method of claim 1, wherein the alkylsulfonic acid is methanesulfonic acid present in a concentration of about 30 g/L and the peroxide is hydrogen peroxide present in a concentration of about 0.9% (v/v).

8. The method of claim 1, wherein additional hydrogen peroxide is added periodically at a rate of about 24 hours for up to about 96 hours.

9. The method of claim 1, wherein said alkylsulfonic acid is present at a concentration of about 1 to about 300 g/L.

10. The method of claim 1, wherein said extraction is carried out at a temperature of about 20° C. to about 100° C.

11. The method of claim 1, wherein said extraction is carried out at a pulp density of about 1%, 2%, 4.7%, or 9.1%.

12. The method of claim 1, wherein said copper content is about 20% to about 40%.

13. The method of claim 1, wherein said alkylsulfonic acid is methanesulfonic acid, ethanesulfonic acid, or propanesulfonic acid.

14. The method of claim 1, wherein said nitrate salt and/or dichromate salt is in contact with copper ore for about 24 hours.

15. The method of claim 1, wherein said nitrate salt is sodium nitrate ($NaNO_3$) or potassium nitrate ($KNO_3$).

16. The method of claim 1, wherein said dichromate salt is potassium dichromate ($K_2Cr_2O_7$) or sodium dichromate ($Na_2Cr_2O_7$).

* * * * *